United States Patent [19]
Luft et al.

[11] Patent Number: 6,015,015
[45] Date of Patent: Jan. 18, 2000

[54] INSULATED AND/OR CONCENTRIC COILED TUBING

[75] Inventors: H. Bernie Luft; Graham Wilde; Peter J. Pelensky, all of Calgary, Canada

[73] Assignees: BJ Services Company U.S.A.; Nowsco Well Service Ltd.

[21] Appl. No.: 08/564,357

[22] PCT Filed: Sep. 21, 1995

[86] PCT No.: PCT/US95/12068

§ 371 Date: Jan. 21, 1997

§ 102(e) Date: Jan. 21, 1997

[87] PCT Pub. No.: WO97/01017

PCT Pub. Date: Jan. 9, 1997

[51] Int. Cl.[7] ................................................. E21B 23/08
[52] U.S. Cl. ........................... 166/384; 166/57; 166/77.2; 166/241.6
[58] Field of Search ........................... 166/57, 77.2, 77.3, 166/77.4, 384, 385, 241.6, 241.7

[56] References Cited

U.S. PATENT DOCUMENTS

| | | |
|---|---|---|
| 2,041,911 | 5/1936 | Ericson . |
| 3,361,202 | 1/1968 | Whipple . |
| 3,397,745 | 8/1968 | Owens et al. . |
| 3,574,357 | 4/1971 | Tirgoviste et al. . |
| 3,643,702 | 2/1972 | Kauder . |
| 3,698,440 | 10/1972 | Matthieu et al. . |
| 4,019,575 | 4/1977 | Pisio et al. . |
| 4,103,320 | 7/1978 | De Putter . |
| 4,252,015 | 2/1981 | Harbon et al. ............................. 73/151 |
| 4,470,188 | 9/1984 | Holbrook et al. . |
| 4,579,373 | 4/1986 | Neal et al. . |
| 4,607,665 | 8/1986 | Williams . |
| 4,624,485 | 11/1986 | McStravick et al. . |
| 4,921,018 | 5/1990 | Dridi et al. . |
| 4,940,098 | 7/1990 | Moss . |
| 5,101,918 | 4/1992 | Smet . |
| 5,160,769 | 11/1992 | Garrett . |
| 5,285,846 | 2/1994 | Mohn . |
| 5,427,133 | 6/1995 | Pringle ................................... 137/155 |
| 5,429,194 | 7/1995 | Nice . |

FOREIGN PATENT DOCUMENTS 3420937  1/1985  Germany .................................. 166/57

OTHER PUBLICATIONS

PCT—International Search Report.
"Elan Showing Positive Single–Well SAGD Results", Daily Oil Bulletin, May 2, 1995.
Technical Drawing—"Single Well SAGD".
Technical Drawing—Detail of "Single Well SAGD".
Technical Drawing—"Steam Flooding"—From Elan Energy Inc. Annual Report 1993.
Technical Drawing—"Application of Insulated Coiled Tubing".
Article from Nowsco Newsletter—Issue 1, 1995; "Unique Insulated Coiled Tubing System."
SPE (Society of Petroleum Engineers of AIME), SPE 11735, p. 653, 1983 Thermal Efficiency of a Steam Injection Test Well With Insulated Tubing.
Diamond Power Specialty Company, Lancaster, Ohio, "Rugged Vacuum Insulated Steam Injection Tubing for Enhanced Oil Recovery". 1995.
Advertisement from a Trade Journal, (Sep. 1994).

*Primary Examiner*—William Neuder
*Attorney, Agent, or Firm*—Sue Z. Shaper; Butler & Binion, L.L.P.

[57] ABSTRACT

A coiled tubing composite comprising insulated coiled tubing, concentric coiled tubing and insulated concentric coil tubing, including structure with centralizers and providing an annulus for insulation. The invention includes a method for assembling concentric coiled tubing, with insulation, and apparatus in combination with the insulated coiled tubing composite for heat assisted production of hydrocarbons and minerals from a wellbore.

71 Claims, 13 Drawing Sheets

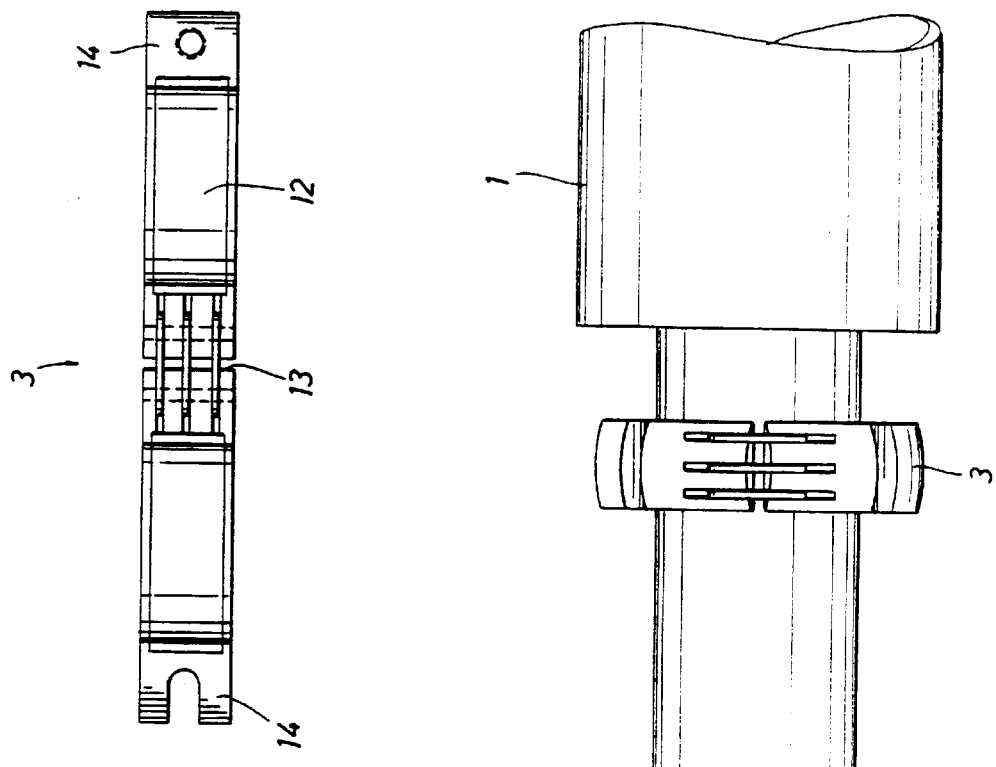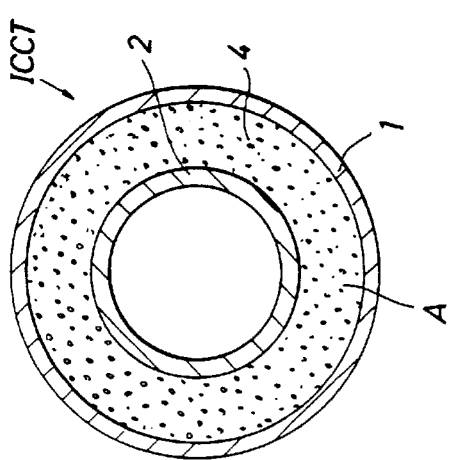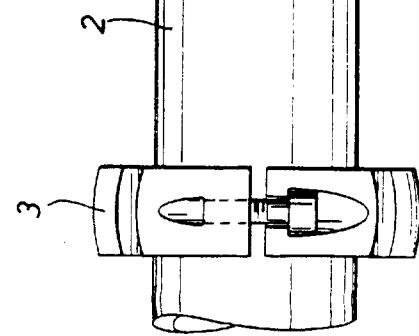
FIG.2A
FIG.2B

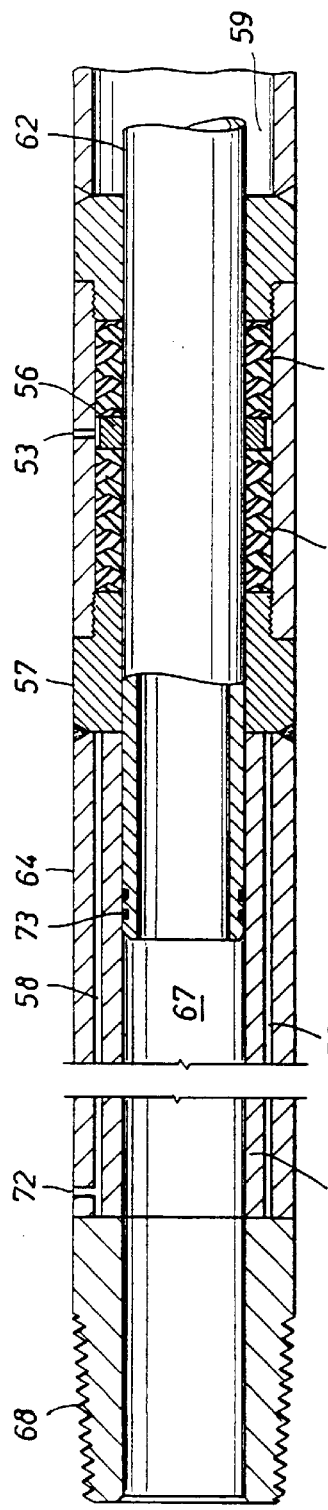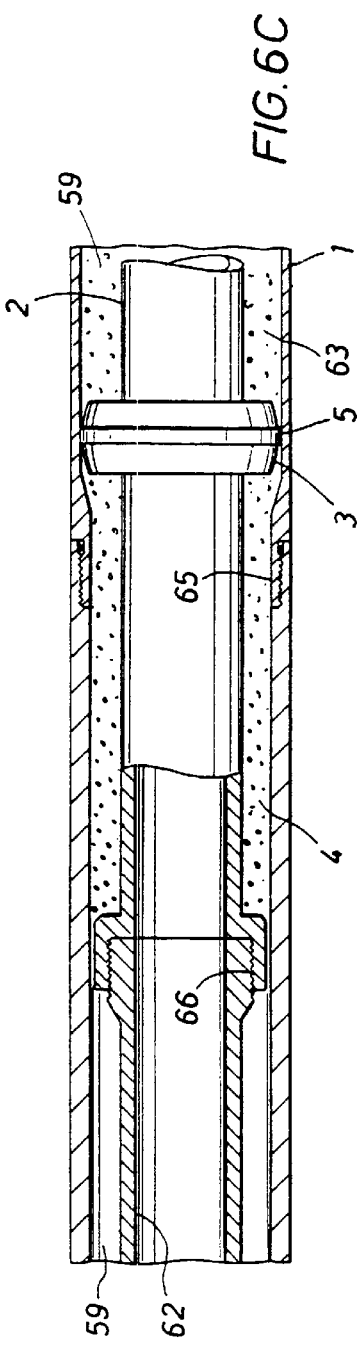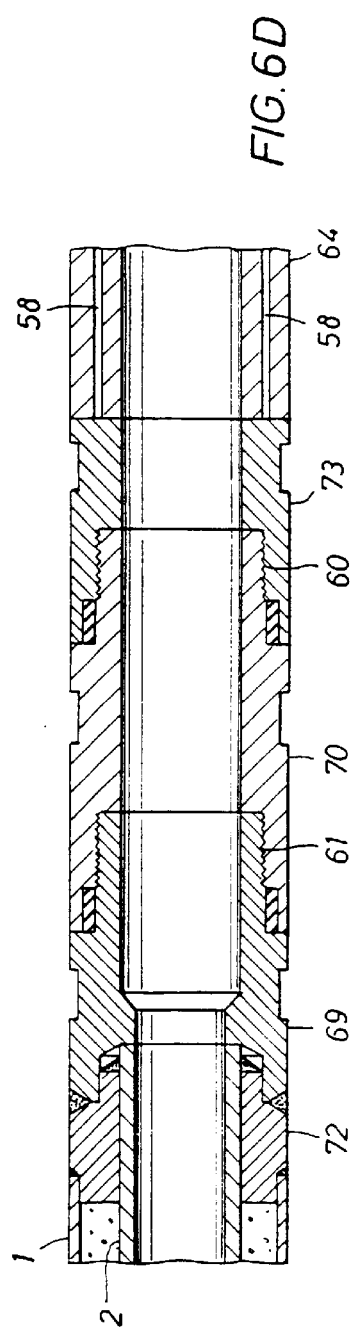
FIG.6A FIG.6B FIG.6C FIG.6D

INSULATED AND/OR CONCENTRIC COILED TUBING

FIELD OF INVENTION

This invention relates to coiled tubing and, more particularly, to insulated coiled tubing and/or concentric coiled tubing, including a method of fabrication of such composites and integration of a coiled tubing composite into operational apparatus.

BACKGROUND OF INVENTION

Over the last two decades coiled tubing has proven increasingly useful in oil and gas field applications, including workovers, drilling, logging and well stimulation. These versatile coiled tubing units typically comprise a continuous length of several thousand feet (possibly up to 20,000 feet) of steel tubing, capable of withstanding pressures in the order of 10,000 psi, capable of being repeatedly coiled and uncoiled from a truckable spool, and capable of being injected and withdrawn from oil and gas wells without killing the well.

Continuous coiled tubing can be run and operated using coiled tubing injectors in a pressurized well. Coiled tubing drilling can be carried out without drilling mud. Fluids can be passed through the tubing for a variety of purposes. Being flexible, coiled tubing has particularly lent itself to horizontal well applications where segmented pipe has difficulty maneuvering and bending, such as through a rapid build out section. As a result in horizontal wells coiled tubing has grown to serve a variety of purposes, from drill pipe to production tubing.

The term "coiled tubing" has a generally understood meaning in the field. "Coiled tubing" lengths are understood to comprise several hundred or several thousand feet of continuous, uniform outer diameter tubing, coilable on a "truckable spool" and injectable in a bore by means of a coiled tubing injector. The continuous lengths are typically, although not necessarily, manufactured of steel having a longitudinally welded seam. Resin and fiber polymer materials are being proposed for continuous tubing. More typically today successive lengths of steel tubing are welded to create a desired unit length. "Coiled tubing" is expected to be able to withstand significant pressure differentials, such as at least 1,000 psi and preferably closer to 10,000 psi, and to be sufficiently corrosive resistant and heat resistant to withstand exposure to common hydrocarbons "downhole."

The term "truckable spool" implies a spool or reel having an outside diameter of no more than six meters, and preferably less, so that the spool can be transported by truck over land and highways to a site. Sufficient flexibility to be reeled on a "truckable spool" implies an ability of the tubing to be repeatedly coiled and uncoiled from such a spool or reel. The ability to be injected in a bore implies that the tubing, while flexible, is also sufficiently stiff that lengths of several hundred or thousand feet can be continuously thrust, or injected, in bores using coiled tubing injection equipment.

The present invention comprises, in one aspect, a new variety of coiled tubing, concentric coiled tubing and/or insulated coiled tubing, sometimes referred to herein as a coiled tubing "composite." The composite fits the definition of "coiled tubing" in that the composite is sufficiently flexible for reeling on a truckable spool and sufficiently stiff to be injected in a bore. The composite satisfies length and pressure and corrosion resistance expectations as well.

Establishing that concentric coiled tubing and/or insulated coiled tubing can be built opens up new and improved uses for coiled tubing. One such use for the novel insulated coiled tubing comprises integration of the tubing into apparatus for the thermal production of hydrocarbons.

Cost, or added cost, is a key factor in the economics of the thermal recovery of hydrocarbons and minerals from viscous underground formations. The versatility and reusability of novel insulated coiled tubing, together with its flexibility and compact size, may so favorably affect profit margins as to render thermal recovery from many additional formations economical. Novel insulated coiled tubing further permits consideration of simultaneous heating and production from a single well.

Heavy oil and tar sands comprise significant existing resources for liquid hydrocarbons to the extent that they can be economically produced. As a general matter, heavy oil from tar sand and bitumen deposits must be heated to reduce the oil or mineral viscosity before it will flow, or to enhance flow. The predominant method for heating utilized in the field is the injection of a hot fluid, usually steam, from the surface, although electrical heating is also practiced. In the absence of a feasible and cost effective method for simultaneously injecting steam and producing fluid from a single well, one common industry practice has been for steam to be injected through a designated "injection" well and heated hydrocarbons produced simultaneously from surrounding "producing" wells. An alternate single well commercial practice has been for steam to be injected intermittently into a production well. In this so-called "huff and puff" system the single well alternates in function from an injection well to a producing well. Certain single well thermal recovery systems have been proposed where the same well is used for simultaneous heating and production. Two such systems are described in U.S. Pat. No. 5,285,846 to Mohn and U.S. Pat. No. 4,019,575 to Pisio, although the Pisio system also uses a second adjacent well for producing a steam drive. Both Pisio and Mohn teach the use of concentric, traditionally segmented pipe joints with their system. Neither teaches the use of coiled tubing. Nor do they teach the importance of insulated tubing designed to minimize the loss of heat to the well bore prior to reaching the formation to be heated. In fact, Pisio appears to teach away from such art.

Insulated segmented pipe string, or jointed thermal pipe, has been developed for use in some thermal applications. It is recognized that insulated jointed tubing limits the thermal energy lost to the overburden during the transport of a heated fluid underground, thereby delivering more thermal energy to an oil or mineral bearing formation. However, insulated segmented tubing, or jointed thermal pipe, is expensive, can be difficult to maneuver in horizontal wells, is slow to run and pull and may unduly restrict annular wellbore space by virtue of the upset of the tubing's joints.

One object of the present invention is to provide a cost effective, versatile maneuverable alternative to jointed thermal pipe. Such apparatus can facilitate simultaneously injecting high quality steam and thermally recovering hydrocarbons from existing single wells. Other downhole and above wellhead uses for the novel concentric and/or insulated tubing are anticipated now that its construction has been proven. The tubing can be specifically tailored to meet the needs of a single application, or it can be designed to meet general off-the-shelf standard specifications. It is to be understood that the particular materials to be selected and the design to be utilized can vary, according to the application limitations to be satisfied.

The apparatus, comprising coiled tubing, should be particularly adaptable to horizontal wells. It may permit variations in thermal recovery methodologies to be developed, such as a practice in which injection sites are varied. Electrical insulation as well as thermal insulation can be offered by insulated coiled tubing, permitting strategies utilizing electrical transmission in lieu of or as well as fluid transmission.

In establishing the viability of insulated coiled tubing the present inventors participated in the implementation of a successful steam injection project. Production in a heavy oil producing well was dramatically increased utilizing the first prototype insulated concentric coiled tubing (ICCT) string. The first prototype ICCT provided a net thermal conductivity roughly equivalent to that of conventional insulated production tubing at a lower overall cost to the producer.

The test project commenced with a search for a cost effective way of delivering high quality steam to a horizontal wellbore. The objective was to implement a cost effective steam delivery system that would permit continuously heating a heavy oil reservoir. This would warm the high viscosity oil allowing it to readily flow into a slotted liner. The oil could then be pumped to surface through a parallel production string within the same wellbore. This new heavy oil production system has been named the SW-SAGD system and is described in more detail in pending patent application U.S. Ser. No. 08/420,038 entitled SINGLE HORIZONTAL WELLBORE GRAVITY DRAINAGE ASSISTED STEAMFLOOD PROCESS AND APPARATUS, hereinafter referred to as "SW-SAGD patent application." Conventional insulated production tubing, or jointed thermal pipe, had been considered for the job, but was determined to be uneconomical and impractical for use at the particular site.

Attempting to satisfy the needs of the test project led the parties eventually to design, construct and install a 1745 meter ICCT string. A loose fill insulation material was chosen for the CCT annulus due to its low thermal conductivity and apparent suitability as a material that would enable the assembly of continuous lengths of concentric coiled tubing. To ensure a uniform distribution of insulating material around the inner coiled tubing, and to centralize an inner coiled tubing within an outer coiled tubing, special ceramic/steel centralizers were developed for the first prototype. These centralizers retained the mechanical and thermal strengths of steel while adding the low thermal conductivity and high service temperatures of ceramic materials. The centralizers, located at strategic locations along the tubing, were designed to resist the mechanical and thermal stress anticipated during initial assembly of the concentric coiled tubing string, as well as during thermal expansion induced under operating conditions and during future coiled tubing operations or workovers.

The first insulated concentric coiled tubing string, consisting of a 650 meter vertical section and a 1050 meter horizontal section including build section, was installed for testing in a heavy oil lease near Provost, Alberta, in January, 1995. Steam injection commenced at a break-in temperature of about 100° C. to 150° C. Although the maximum steam injection design temperature was 350° C., initial temperatures were reduced to preclude thermal shock effects. Over the following days steam injection temperatures were increased to about 300° C. Production levels began to climb steadily and target production rates were exceeded. After the establishment and propagation of a steam chamber within the oil bearing formation, in accordance with the SW-SAGD method taught in the SW-SAGD patent application, the well continued to produce at levels well above those expected and at steam volumes considerably less than design values.

Further novel strings are being constructed and tested in other thermal Enhanced Oil Recovery (EOR) production pilot projects, including additional continuous injection and production wells. The technology offers excellent potential for significant reductions in heating costs and increased oil production. Utilization of insulated and/or concentric coiled tubing with conventional "huff and puff" steam injection processes may offer advantages for operators. Traditional steam assisted gravity drainage and other techniques may also find use for the novel apparatus.

The present invention comprises insulated coiled tubing and/or concentric coiled tubing. Two sets of factors come into play in designing particular units of such tubing. The first set of factors comprises the degree of insulation required or the rigor of the insulation limitations imposed, thermal or electrical or both. The second set of factors comprises the cost effectiveness of the product for the intended use. The most cost effective embodiment of the invention for the initial project, and hence the preferred embodiment disclosed in depth below, comprised dual coiled tubing, concentrically arranged, having insulation in the annulus, referred to as ICCT. Insulated coiled tubing, however could be formed based upon a single coil with insulation attached, either without or within. Forms of insulation exist which could be used for wrapping or filling or lining the interior of such coils. The present inventors reviewed and evaluated and simulated many such alternate embodiments. Given the required thermal insulation characteristics, cost effectiveness limitations and necessity to minimize time and effort set by the initial project, the particular embodiment of the ICCT or insulated concentric coiled tubing disclosed below was preferred for the initial prototype. It is to be understood that other end uses might render an insulated single coil, either insulated within or without, a viable, cost effective embodiment, as well as concentric coils utilizing many alternative insulating strategies. For instance, fluids could be transmitted alternatively, or simultaneously, through a concentric coil annulus.

SUMMARY OF THE INVENTION

The invention compromises, in a preferred embodiment, a continuous coiled tubing composite including an inner coiled tubing positioned within an outer coiled tubing. The two tubing lengths define an annulus that can be insulated, or can contain insulation material. (It is to be understood that one means of "providing insulation" is to provide a vacuum. A vacuum can comprise an insulating material.) A plurality of centralizers are longitudinally spaced within the annulus separating the tubings. The composite itself retains sufficient flexibility for reeling on a truckable spool and sufficient stiffness for injecting in a bore.

Size is generally a constraint in downhole operations. It will typically be desired that a coiled tubing composite perform its function while minimizing the composite's outside diameter. For that reason, "concentric" coiled tubing, as opposed to off centered tubing, suggests itself as the cost effective and practical design when dual coils are to be utilized. Concentricity has further structural benefits when taking into consideration the operations of reeling a dual coiled tubing string on a spool. However, it should be understood that insulated dual coiled tubing could function if it were not concentric, or if a plurality of "centralizers" separated but did not maintain exact "concentricity."

It is anticipated that the inner tubing length and the outer tubing length that form a coiled tubing composite would each comprise at least several hundred feet. It is further anticipated that insulated coiled tubing composites would exhibit sufficient structural integrity, including flexibility and stiffness, to be repeatedly reeled and unreeled into, and repeatedly injected and withdrawn from, a wellbore.

In preferred embodiments the annulus between the inner and outer coil would be generally sealed against fluid communication with the environment exterior to the tubing Preferably, the annulus would be sealed to generally exclude fluid communication from outside the environment while providing for at least limited internal fluid communication within the annulus itself.

In a preferred embodiment of concentric coiled tubing, at one end of the composite the inner tubing length would be affixed to the outer tubing length while at the other end of the composite both lengths would be attached to an expansion joint. At each end of a composite the inner length preferably seals against either the outer length or an expansion joint, thereby sealing the annulus between the two tubings.

It is envisioned that the outside diameter of the inner tubing length could range from between one inch and five inches while the outside diameter of the outer tubing length could range from between two inches and six inches. The annulus is preferably about ½ inch wide.

The "insulation" of the composite could include a vacuum, inert gas, loose fill particles, and in particular, finely ground loose fill particles. Finely ground perlite has been found to be particularly effective, for example mesh size 0.05 inches (1.19 mm) or U.S. screen sieve #16 will retain only trace amounts insulation particles.

A preferred design of the centralizers provides for fluid communication longitudinally through the centralizers. Such communication can be provided by outer peripheral grooves, which also serves to minimize radial thermal conduction. Preferably the centralizers comprise split steel rings spaced between the two tubes at intervals of between five and seven feet, or at approximately six foot intervals. Preferably a steel centralizer includes a liner formed of a ceramic or ceramic paste. Such liner forms the primary contact between the centralizer and the inner coiled tubing. Preferably the liner and the centralizers have similar co-efficients of thermal expansion while the liner exhibits a low thermal conductivity and a high co-efficient of friction. The outer periphery of the centralizers are preferably crowned, for providing a limited contact surface with the outer tubing and thereby minimizing heat conduction and friction therebetween. It should be understood that given appropriate thermal conductivity restraints, it would be possible for centralizers to be devised largely or totally out of insulation material itself. An insulation material could perform the centralizer function under certain design constraints.

The invention also includes a method for assembling concentric coiled tubing and in particular, a composite containing particulate insulation. The method includes attaching a centralizer to a portion of a first coiled tubing length, inserting the centralizer and a portion of the first tubing length into an end of a second coiled tubing length and repeating the steps. The method also includes filling the annular region defined between the inner and outer tubing lengths between the centralizers with insulating material. It may be preferable to straighten a portion of the first and/or second tubing length with a pipe straightener prior to inserting the inner tubing into the outer tubing. For assembly purposes the outer tubing length is conveniently deployed in a vertical well. Vibrating the outer length during assembly can improve insulating characteristics of the composite when using fine grain particulate or loose fill insulation. Attaching centralizers and filling with insulation is preferably performed in a continuous nonstop manner during assembly.

The invention further comprises apparatus for a heat assisted production of hydrocarbons and minerals from a wellbore. This apparatus includes several hundred feet of insulated tubing coiled on a truckable reel, a coiled tubing injector for receiving coiled tubing from a reel and injecting the coiled tubing into a wellbore and a source of heat placed in communication with the tubing. The apparatus can include an expansion joint or joints attached to the tubing. The source of heat may be a heated fluid, such as steam. Alternately, or in addition, the tubing may be electrically conducting, the insulation may be electrically insulating and the source of heat may comprise a source of electric current or electromagnetic radiation in contact with said tubing.

The invention also comprises in an alternative embodiment coiled tubing apparatus including a reel having a diameter of less than six meters, a continuous length of tubing coiled on the reel, the tubing having diameter of less than ten inches, material attached to the tubing providing for radial insulation along its length and a tubing injector adapted to receive the tubing from the reel and inject the tubing into a bore. The tubing should be capable of withstanding heat of at least 250° C., capable of withstanding the corrosion of normal oil and gas well fluids and capable of withstanding pressure of at least 1,000 psi. The bore could comprise surface pipe.

The present invention of "insulated and/or concentric coiled tubing," to the inventors' best knowledge, was unknown in the industry before their work. At significant risk of failure, the inventors reduced insulated coiled tubing to practice, invented concentric coiled tubing and proved the composite's utility, fitness for purpose, cost effectiveness and efficiency.

Disclosed in detail below is a prototype embodiment developed for the first application as well as the thinking and testing that lead to specific decisions on design and materials. This preferred embodiment was developed, it must be understood, under time, cost and specific physical location constraints. Time has not yet permitted constructing prototypes for all alternative construction methods and/or all alternative materials and designs envisioned. Many of these possibilities or alternatives are mentioned in the discussion below together with why they were not selected for the initial prototype. Some alternatives of materials or designs may well prove optimum for applications with different physical limitations or in situations permitting greater time to fabricate.

Thus, insulated coiled tubing and/or concentric coiled tubing is made from coiled tubing, single or dual. Importantly, insulated and/or concentric coiled tubing comprises itself coiled tubing, as coiled tubing is understood in the industry. In addition, insulated coiled tubing provides insulation, thermal and/or electrical, potentially as great as or greater than jointed thermal pipe known in the industry. The uses for concentric and/or insulated coiled tubing may become legend, just as the uses for coiled tubing are multiplying with the sophistication of the exploration, production and refining capabilities in the petrochemical world.

BRIEF DESCRIPTION OF THE DRAWINGS

A better understanding of the present invention can be obtained when the following detailed description of the preferred embodiment is considered in conjunction with the following drawings, in which:

FIG. 2A is a cross section of insulated concentric coiled tubing.

FIG. 2B is an elevational view of concentric coiled tubing.

FIGS. 6A–6D illustrate an embodiment of a thermal expansion joint, in cross section.

Tables I–IV follow the Figures and are explained in the text.

DETAILED DESCRIPTION OF PREFERRED EMBODIMENTS

| | | |
|---|---|---|
| ICCT | = | Insulated concentric coiled tubing. |
| SW-SAGD | = | Single well-steam assisted gravity drainage. |
| CCT | = | Concentric coiled tubing. |
| CT | = | Coiled tubing. |
| CTU | = | Coiled tubing unit. |
| ID | = | Inside diameter. |
| OD | = | Outside diameter. |
| GMAW | = | Gas metal arc welding |
| $Gr_b$ | = | Grashof Number based on the ICCT annular gap, b. |
| $Gr_b$ | = | $\rho 2 g \beta (T_i - T_o) b^3/\mu^2$ |
| $\rho$ | = | Fluid density, $lb_m/ft^3$ |
| m | = | Dynamic viscosity, lbm/sec-ft. |
| $\beta$ | = | Coefficient of volumetric thermal expansion, 1/R. |
| R | = | Absolute temperature, degree Rankine. |
| T | = | Temperature, degrees Fahrenheit. |
| $T_i$ | = | Temperature at inner tubing boundary. |
| $T_o$ | = | Temperature at outer tubing boundary. |
| $T_m$ | = | Mean temperature, $(T_i + T_o)/2$. |
| $\Delta T$ | = | $T_i - T_o$. |
| g | = | Acceleration of gravity, ft/sec$^2$ |
| k | = | Coefficient of thermal conductivity, Btu/hr-ft-F. |
| $k_m$ | = | K based on means annulus temperature. |
| $k^s$ | = | 'k' with centralizers at spacing "s". |
| $k^o$ | = | 'k' with loose fill insulation only |
| $k^1$ | = | 'k' with centralizers at 1-foot intervals. |
| s | = | Centralizer spacing measured in feet. |

Preferred embodiments for an insulated and/or concentric coiled tubing, together with a method of assembly, are described in detail, including concepts and functional specifications for a thermal expansion joint to be used with such an ICCT. Subsequently a method of use for insulated tubing will be disclosed. This will be followed by a brief history of the design, testing and experimental results of the first, and successful, prototype of insulated and/or concentric coiled tubing.

Insulated and/or Concentric Coiled Tubing—Design and Description

Figure 1A:
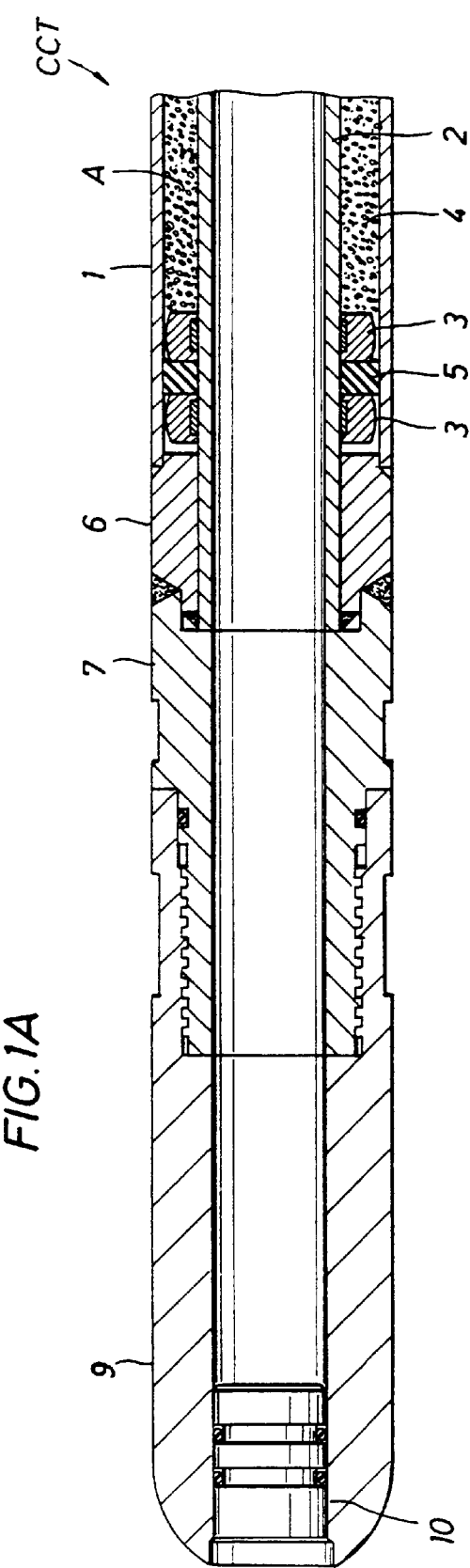
FIGS. 1A and 1B illustrate in cross section end connection for concentric coiled tubing for affixing and sealing an inner tubing to an outer tubing as well as to a nozzle.
Figure 1B:
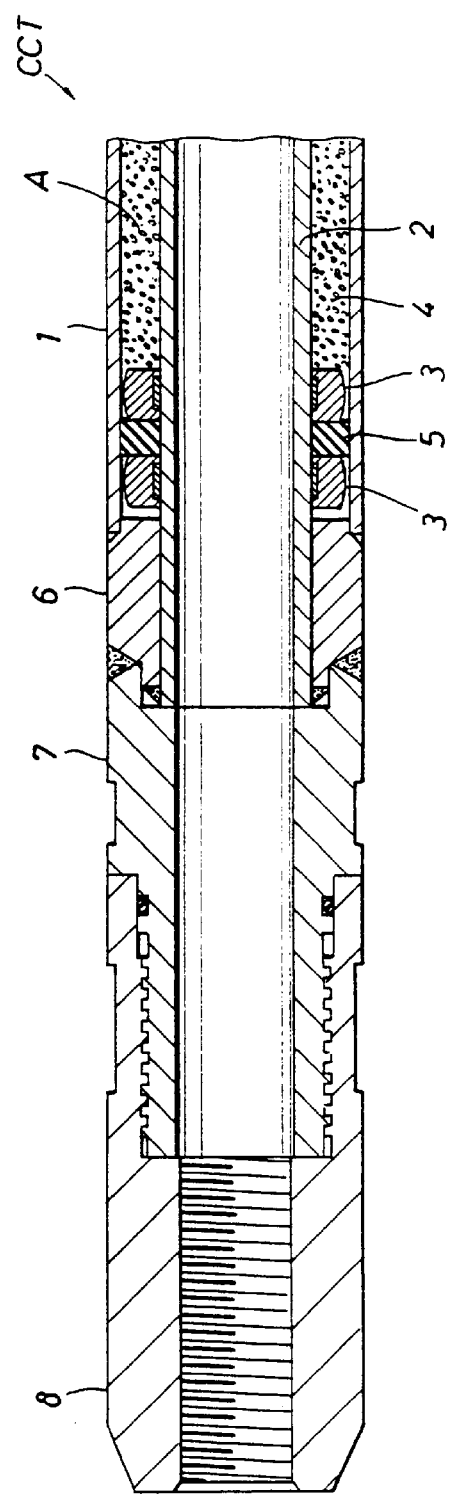

FIGS. 1A and 1B illustrate in longitudinal sectional view a preferred embodiment for making up the downhole end of an insulated concentric coiled tubing (ICCT) composite. Steam nozzle 9 is illustrated at the left of FIG. 1A connected to a portion of a CCT tubing on the right, which CCT composite constitutes a preferred embodiment of the present invention. The nozzle end connection would be made up for use prior to injecting through a blow out preventer (BOP). FIG. 1B illustrates concentric coiled tubing having its downhole end fitted with a grapple connection, useful for pulling from a reel.

The insulated coiled tubing of the preferred embodiment consists of outer coiled tubing (CT) 1 of continuous and indefinite length and inner coiled tubing CT 2 also of a continuous and indefinite length. Continuous and indefinite length implies a length of at least several hundred feet, possibly cut to suit a particular application and possibly having a length to be determined by other factors. Typical lengths may include 2,000 feet lengths without the use of tubing connectors of any kind.

Tubing 1 is designed to have a wall thickness and to be comprised of material of sufficient strength to withstand the CCT assembly and installation loads. The internal flash or weld reinforcing of any longitudinal seam welds used in the manufacture of tubing 1 are preferably removed to prevent interference with centralizers 3 during assembly of the CCT.

Tubing 2 is designed to have a wall thickness, strength and alloying composition to withstand anticipated internal pressures and temperatures and to provide the material degradation resistance of anticipated conveyed fluids and service environment. The strength and wall thickness of tubing 2 are generally greater than those of tubing 1. Typical wall thicknesses might run 0.175 inches for inner tubing 1 and 0.134 inches for outer tubing 2.

Tubing 2 is installed concentric within tubing 1. During installation the annular space A formed between tubing 1 and 2 is, in a preferred embodiment, filled with a loose fill granular insulation, such as perlite. A special grade of insulation, one which exhibits a fine and uniform grain size, such as mesh size 0.05 inches (1.19 mm), is preferably utilized. The material properties of the insulation 4 are preferably such that frictional resistance during ICCT assembly is of a sufficiently low value that it enables assembly of long continuous lengths of ICCT sections. Further, the compaction properties of insulation 4 are preferably such that the establishment of natural (free) convection loops are prevented in the ICCT annulus. The thermal properties of the insulation 4 are also preferably such that the thermal conductivity is low, typically in the range of 0.04 to 0.05 Btu/hr-ft-°F.°. The insulation 4 is able to absorb radiated heat emitted from a hot inner CT 2. Furthermore, the insulation property of material 4 is preferably such that the thermal conductivity is not adversely affected by the diffusion of contaminating gases, such as hydrogen, into an ICCT annulus.

The concentricity of the inner and outer CT in the preferred embodiment is maintained by centralizers 3 which are illustrated in detail in FIGS. 4 and 5. Two centralizers in between which a pliable wiper 5 is sandwiched, are preferably installed at the nozzle end of the CCT string. See FIG. 1A. The wiper 5 tends to prevent the passage of loose fill insulation 4 during assembly of the ICCT. The two adjacent initial centralizers secure the wiper 5 and also serve to guide a leading end of an inner CT 2 as well as provide additional wear resistance during assembly of the ICCT.

A weld connection ring 6 serves to seal the ICCT annulus at the nozzle end. Ring 6 also serves to anchor the inner CT 2 to the outer CT 1 at the downhole end such that the relative thermal expansion between the inner and outer CT occurs in an upstream direction where polished bore receptacles (PBR) and/or thermal expansion joint(s) (TEJ) are installed to accommodate the larger thermal expansion of the inner CT 2. See FIG. 6. Weld ring 6 also provides a means to attach the nozzle/grapple crossover sub 7 to the downhole end of the ICCT string. Crossover sub 7 is permanently welded to weld ring 6 at the upstream end and contains a threaded male pin or stub at the downstream end for connection of the wine rope socket 8 during ICCT assembly and for connection of the flow nozzle 9 before installation into a well bore. The socket 8 would be connected to a wire rope, useful to help manipulate the ICCT string during assembly and for spooling on a transport reel. Such reels are used for shipping an ICCT string onto a well installation site. A nozzle plug 10 prevents the entry of foreign matter and the plugging up of the nozzle during ICCT installation. Plug 10 can be ejected by the pressure of fluids conveyed along the ICCT string.

Single centralizers 3 are attached to the inner CT 2 at precisely controlled intervals along the entire length of the ICCT string. FIG. 2B illustrates such assembled centralizers, although not necessarily at the preferred spacing. Assembly of continuous ICCT sections is enhanced if the optimal spacing of the centralizers is determined and maintained for the tubing and the insulation to be used. Centralizer spacing may also be important for powdered insulation since each centralizer may only be able to reliably transport an annular column of insulation of a certain maximum length. Longer columns of insulation result in greater sliding friction resistance. This results in a greater compression of the insulation column which in turn generates greater frictional resistance. Application of an increased compressive force to overcome higher friction may ultimately result in a pack of the insulation and prevent further advance of the inner CT. Whereas the maximum spacing of the centralizers may be constrained by the insulation friction and compression characteristics, the minimum spacing of the centralizers may be governed by an increase in ICCT heat loss generated by the thermal wick effects of the centralizers. Although the centralizers are designed to minimize heat transfer and maximize strength, a reduction in spacing results in progressively increasing thermal losses. The critical range in centralizer spacing embodied in the first prototype ICCT limited the increase in overall thermal conductivity to approximately 10% above that obtained without thermal wick heat loss effects.

FIGS. 4A–4G and FIGS. 5A–5E as well as FIG. 2B illustrate in detail ICCT centralizers of the type embodied in the first prototype of the invention. FIGS. 5A–5E present a modified version of the embodiment of FIGS. 4A–4G, discussed below. This centralizer is constructed of a composite design comprised of a steel body 11 and ceramic paste liner 12. The steel provides the necessary strength and high service temperature capability. The ceramic paste provides heat insulation and frictional sliding resistance as well as desired operational temperature capabilities. A hinged connection 13 facilitates the clamping of the centralizer on the outside of an inner CT 2 during assembly of the ICCT. The threaded connection 14 which is diametrically opposite to the hinged connection 13 provides an initial clamping force to locate the centralizer at the necessary spacing during ICCT assembly. Radial set screw 15 is then tightened to securely fasten the centralizer to the inner CT and provide positive locking against slippage relative to the inner CT.

A convex profile or crown 16 may be machined on the outer perimeter of a centralizer to facilitate sliding along the inner surface of the outer CT during ICCT assembly. The crown is case hardened to provide wear resistance while the centralizer base may retain a softer and tougher core to provide resistance against possible stress corrosion cracking. The crown 16 furthermore limits the area of contact between the centralizer and the outer CT to minimize the radial conduction heat flow. Axial slots or apertures or grooves 17 are machined into the centralizer body. These slots permit the passage of granular insulation within the annulus to help preclude the formation of insulation voids adjacent to the centralizers. The slots 17 furthermore enable the equalization of pressure within the annulus along the length of the ICCT string. The radial heat flow is minimized further by the slots 17 which limit the area of contact with the outer CT to a finite number of centralizer teeth 18 remaining after machining the slots 17.

A continuous circumferential groove 19 is machined on the inside diameter of the first prototype centralizer. This groove is flanked on both sides by beveled edges 20 machined to a knife edge along their locus of contact with the inner CT. The knife edge minimizes the area of contact between the steel body of the centralizer and the inner CT to reduce the radial heat flow losses. The groove 19 serves to contain the special ceramic paste, comprising liner 12, which forms a thermally insulating barrier over the main area of contact between the centralizer and inner CT. The high coefficient of friction between the ceramic liner and steel surface of the inner CT contributes to the sliding resistance of the centralizers along the inner tubing.

The ceramic paste 12 used as the thermally insulating liner and embodied as a component part of the first prototype of the invention, is prepared from a specially formulated silica material and alloying constituent. This formulation is designed to minimize the co-efficient of thermal conductivity and provide a coefficient of thermal expansion comparable with that of the steel body of the centralizer. The ceramic paste is able to withstand the higher operating temperatures of the inner CT and is rated for service temperatures exceeding 1,000° F. Because the thermal conductivity of the ceramic paste 12 is less than 2% that of the steel body of the centralizer, a large reduction in heat transfer or thermal wick heat losses is achieved with the composite centralizer design. When assembled at the critical centralizer spacing, the incremental increase in overall thermal conductivity of the ICCT should be limited to approximately 10%.

Retainer 21 serves to hold the assembly screw(s) in place at connection 14, to ready the centralizer for stabbing and rapid make-up during ICCT assembly.

ICCT Construction and Assembly

FIGS. 3A–D illustrate an ICCT preferred assembly procedure which is embodied in the present invention. A framework 22 is erected above a vertical well 23 of minimum depth of 2,000 ft. or of sufficient depth to assemble the desired continuous length of ICCT section. A blowout preventer (BOP) 24 is installed on the well casing bowl. The BOP is equipped with slips of sufficient capacity to hold the entire ICCT length in suspension in well 23.

A CT injector 25 equipped with two endless chain loops 26, as known in the industry, is mounted on top of the assembly substructure 22. The injector 25 is equipped with chain blocks suitable for the outer CT diameter. Injector 25 forms part of a coiled tubing unit (CTU) (not shown in completion) which controls the injector chains 26 the BOP 24 and other CT handling components such as a powered spooler which feeds the CT to the injector from a tubing storage reel (not shown). A tubing straightener 40 may be installed on substructure 22 below injector 25 to straighten the outer CT.

The outer CT 1 is fed into the well 23 by the injector until the entire CCT string design length has been inserted leaving only sufficient length above the BOP for the outer CT to extend a few feet above the working platform elevation 27. A threaded male coupling or pin 28, FIG. 3D, is butt welded to the outer CT at position 29, using an advanced, fully-automatic orbital welding process. A hanging flange 30, FIG. 3C, with a threaded central bore, is screwed onto male pin 28 and two lifting sling eye bolts are also threaded into the hanging flange 30. A crane hook is attached to the lifting sling. The BOP slips from which the outer CT had been suspended, are released so that the outer CT is now suspended from the crane hook. The crane lowers the outer CT string until the hanging flange is seated on pedestal 31, the pedestal being supported on a hanging frame 32. The BOP slips are again set to provide a second point of CT suspension as a safety measure and to suspend the ICCT string when the threaded pin 28 is later removed to either connect a previously assembled section of ICCT or to permanently attach by welding a threaded fitting for connection to an expansion joint.

Figure 3A:
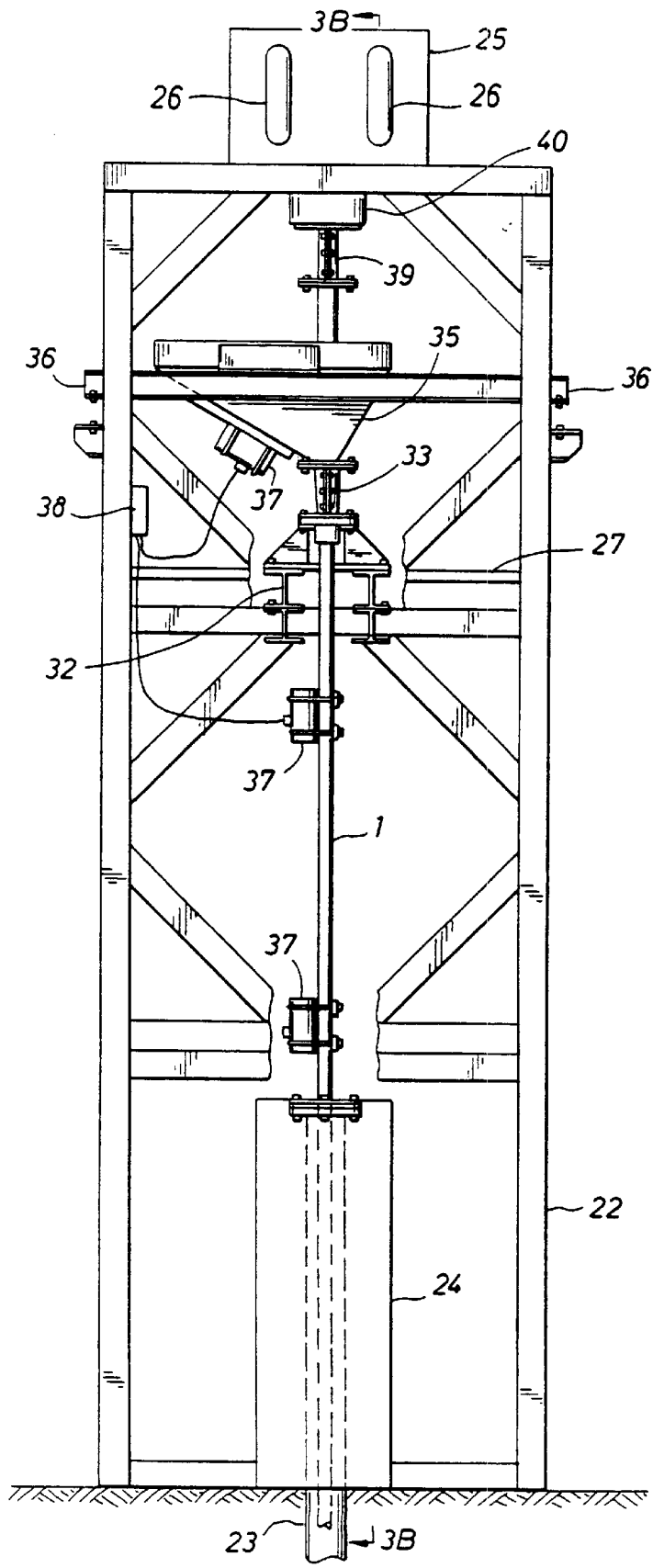
FIGS. 3A, B, C and D illustrate structure to be used in fabricating insulated concentric coiled tubing.
Figure 3C:
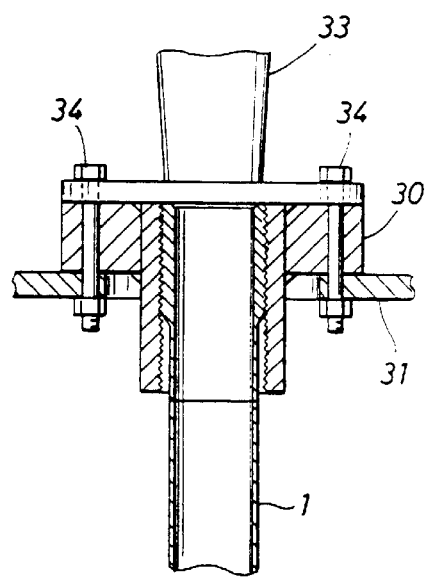
FIGS. 3C and 3D highlight details of the housing of the tubing on the structure.
Figure 3B:
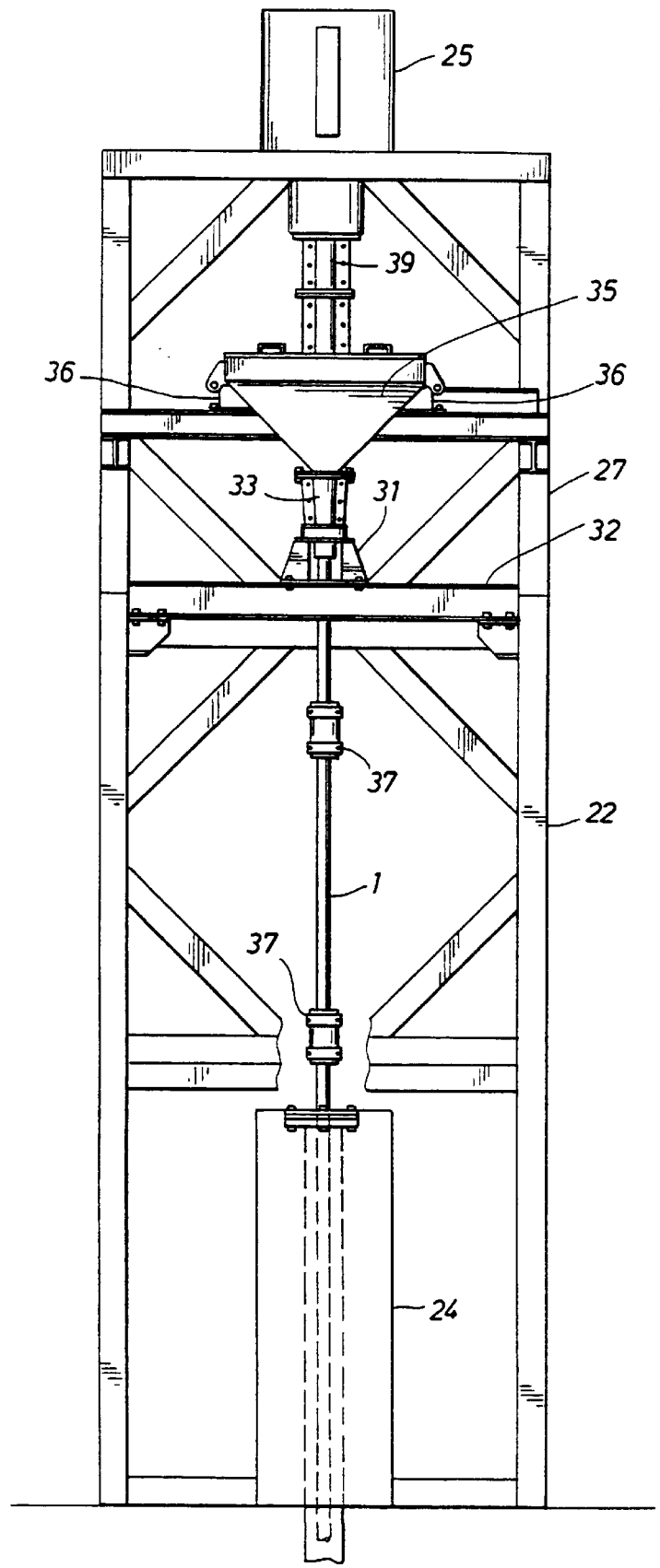
FIG. 3B offers a cross sectional perspective of FIG. 3A.
Figure 3D:
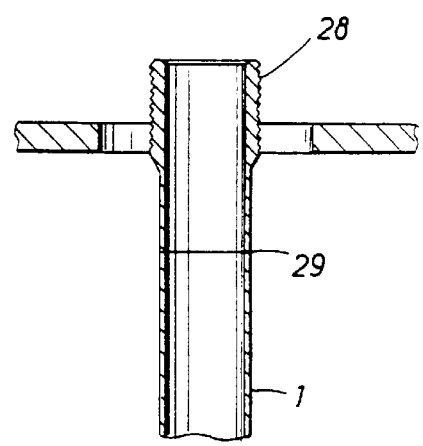
Figure 4A:
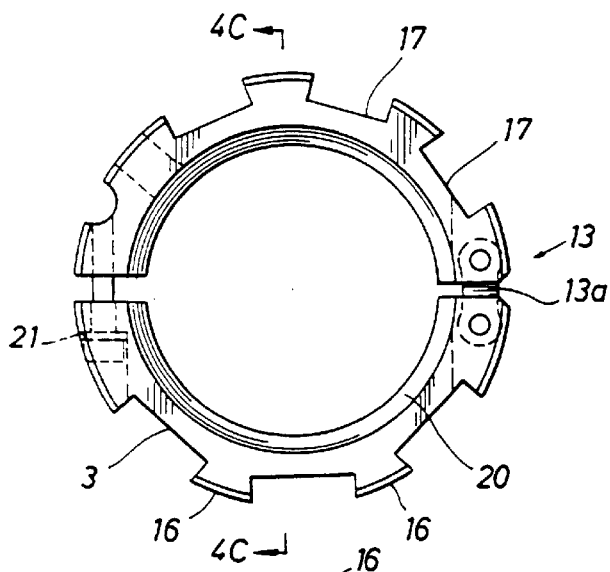
FIGS. 4A through 4G illustrate a centralizer, including centralizer parts and selected cross section views thereof.
Figure 4B:
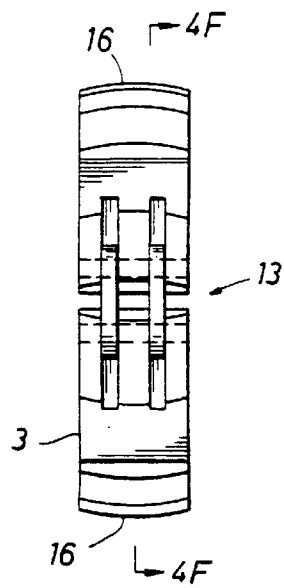
Figure 4C:
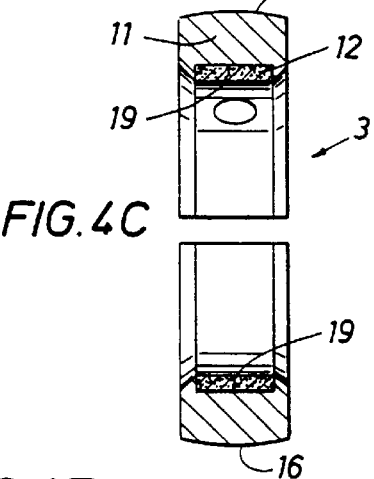
Figure 4D:
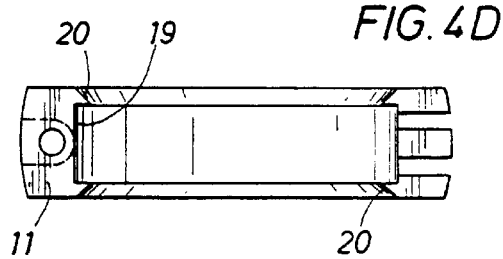
Figure 4E:
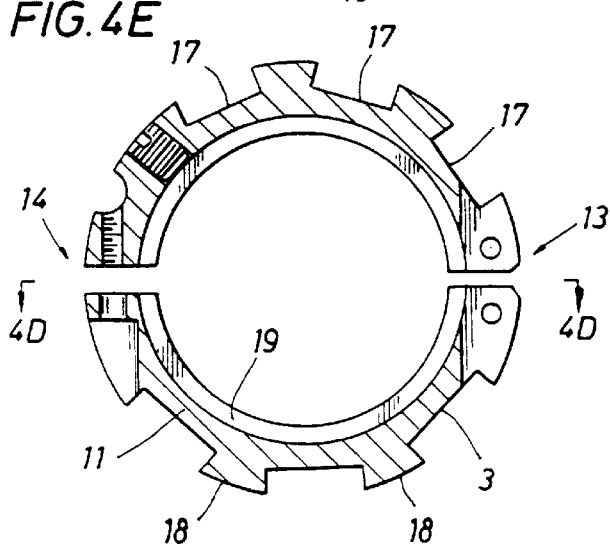
Figure 4F:
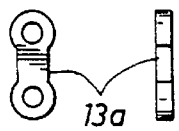
Figure 4G:
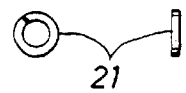
Figure 5B:
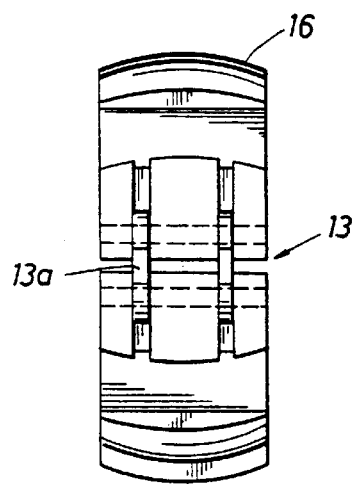
FIG. 5 illustrates an alternate embodiment for a centralizer.
Figure 5A:
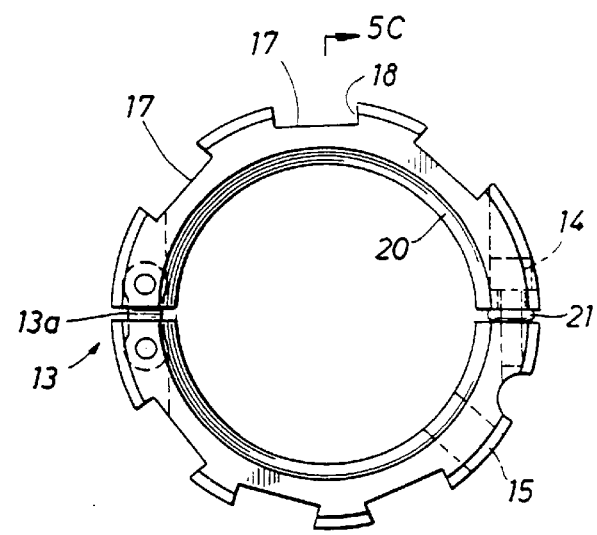
Figure 5C:
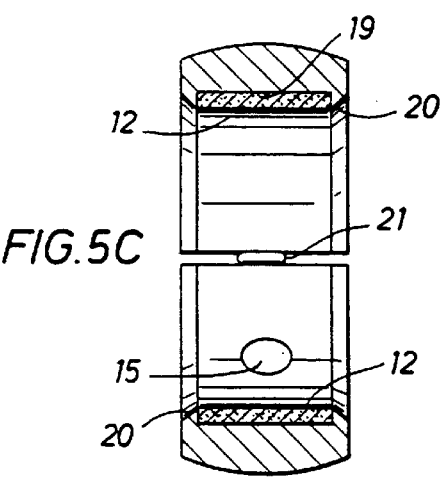
Figure 5D:
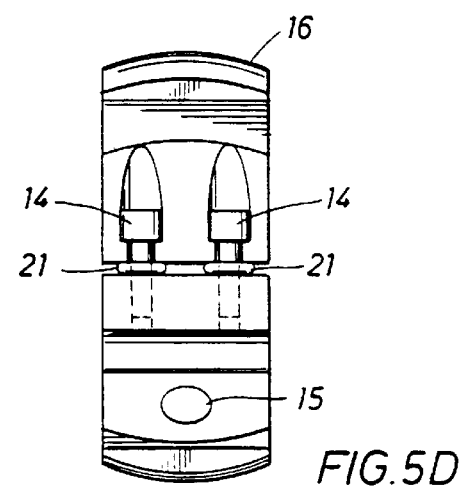
Figure 5F:
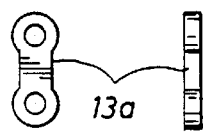
Figure 5E:
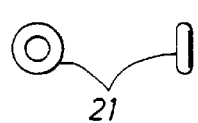

A CT guide chute 33 FIG. 3C, is placed on top of the hanging flange 30 and the three components 30, 31 and 33, are bolted firmly together by common bolts 34. The guide chute 33 is constructed to have a gradual inward taper extending from the outlet of an insulation fill hopper 35 at the top of the chute to the bottom of the chute where the inside surfaces of the guide chute are flush with the inside bore of pin 28. See FIG. 3C. The guide chute 33 is constructed of a truncated pyramid design with the four inside surfaces being comprised of removable wear plates. Excessive wear of the inside surface(s) of the guide chute due to the scraping action of successive centralizers as the inner CT is inserted may result in failure of the guide chute 33 to properly centralize the inner CT within the outer CT. Since that may result in the centralizer snagging on the upper edge of pin 28, the worn plates of the guide chute 33 can be replaced to restore its proper centralizing function. The guide chute 33 is also split in the axial direction by a bolted flange connection. With the insulation fill hopper 35 suspended on support beams 36, the guide chute 33 may be removed individually in the event of a jammed or broken centralizer or for inspection of worn guide chute wear plates.

The insulation fill hopper 35 is next set on top of the guide chute and aligned by means of a bolted flange. The main support for hopper 35 is provided by beams 36. Electrically driven bin vibrators 37 are attached next, one to the bottom of the insulation fill hopper 35 and one at center span of the exposed outer CT 1. The vibrators are equipped with adjustable force and frequency settings. These have been determined in prior laboratory testing for optimum compaction of the loose fill insulation selected.

Injector 25 is next removed and replaced with one having chains 26 with blocks to suit the outside diameter of the inner CT. A tube straightener 40 and CT guide and support extension 39, respectively, are attached to the union fitting at the stuffing box end of the injector. Extension 39 serves to reduce the slenderness ratio of the unsupported length of the inner CT. A lower slenderness ratio enables a larger compressive force to be applied to overcome the frictional resistance during insertion of the inner CT, and as a result, a greater resistance to column buckling of the unsupported length of the inner CT. The wall thickness of the inner CT has also been selected to provide a larger section modules for increased resistance to buckling. For the same reason, injector 25 is carefully mounted on substructure 22 so that the centerline of inner CT exiting at the stuffing box end of injector 25 is plumb with the centerline of the outer CT 1, at the entry point of hanger flange 30. The tube straightener 40 aids in reducing friction during assembly caused by residual curvature-of the inner CT from having been spooled.

Two centralizers with wiper 5, as illustrated in FIG. 1, are attached at a leading end of the inner CT 2. Insulation fill hopper 35 remains empty while inner CT 1, is inserted below the elevation of the BOP slips to ensure that an obstruction has not been created in the outer CT by possible indentation caused by the slips. The inner CT is withdrawn until the bottom centralizer and wiper assembly are located at the hanger flange 30. CTU control panel gauges are set to zero depth corresponding to this location. CTU weight indicator gauges were also set to zero while running in without insulation so that the actual frictional resistance attributable to ICCT assembly can be monitored and recorded on an on-board data acquisition system.

Insulation fill hopper 35 is filled with three bags of special grade, loose fill insulation, each bag of 4 cubic foot capacity. Additional bags are stored and readied nearby to maintain a full hopper while insulation becomes consumed, to ensure that ICCT assembly can progress continuously without stoppage until the desired and/or maximum ICCT section length has been assembled. A two-man crew attaches one centralizer at a prescribed interval while the inner CT is continuously inserted into the outer CT. Bin vibrators 37 are switched on. The speed of insertion is set at a consistent value of approximately 7 to 10 feet per minute. Correct centralizer spacing is maintained either by pre-applied markings on the inner CT or by CTU depth gauge reading and radio communication between CTU controller and ICCT assembly crew. The amount of insulation consumed over a given assembled ICCT length is recorded to ensure proper compaction of the ICCT annulus.

When the desired ICCT section length has been obtained, the inner CT is clamped off against the outer CT and cut above the clamp. Injector 25 is removed and replaced with an injector equipped with larger chain blocks 26 suitable for the outer CT size. The assembled ICCT section is withdrawn from the assembly well after cutting the hanger flange, and wound on a CT storage reel which is mounted on a powered CT spooler. Threaded pin 28 is rewelded to the outer CT while suspended by the BOP slips. The hanger flange 30 and lifting sling eye bolts are screwed in place and the remaining outer CT is hung from pedestal 31.

The ICCT assembly procedure may be repeated until the desired ICCT section lengths have been constructed. If a section length is greater than the maximum length which can be assembled due to limiting frictional resistance, a butt welded ICCT girth joint may be prepared between two ICCT sections using orbital TIG welding process. Similar welds are performed during ICCT assembly to attach threaded fittings which are used to connect thermal expansion joints at the ICCT installation well site.

Tests have indicated that concentric coiled tubing strings, with centralizers and perlite insulation, might be assembled horizontally. The choice between vertical and horizontal methods may depend upon convenience and access to the manufacturer.

Expansion Joint

The relative expansion of an inner coiled tubing with respect to an outer coiled tubing resulting from temperature differences created by steam flows in the system may be more than can be absorbed by elastic deformations in the tubing. Unless there is a mechanism for allowing thermal expansion or contraction to occur with minimal resistance, a structural failure of the ICCT could result.

Calculations of the heat transfer processes in the well based on the expected heat transfer characteristics of the ICCT should be carried out to obtain the temperature profiles for each of the coiled tubing strings. Such temperature profiles can be utilized to compute differential changes in length between inner and outer strings. Since high temperatures are to be expected, variation in the linear coefficient of thermal expansion with temperature should be accounted for in length change calculations.

The location of any expansion joints within an ICCT and the number used should be determined by the overall length of the ICCT. In general, the greatest differential expansion may be expected at the wellhead end. However, since the frictional resistance of any insulating powder and centralizers to this relative movement cannot be predicted reliably, it is not recommended that a single expansion joint at the wellhead be used. A more reliable arrangement would comprise 2 or more expansion joints located: one at the wellhead, location 51 in FIG. 10; and one at the beginning of a highly deviated section of a well, locations 50 on 50' in FIG. 10.

The sealing system within the joint should be made of materials that will endure at the temperatures and pressures to be expected. For many steam injection programs temperatures will be in excess of 300° C. and special sealing materials are needed. The selection of the material, its forming into the appropriate form to make a seal and the dimensions of the seal are design factors which can be subcontracted to specialist vendors.

In theory an expansion joint could comprise a simple extension of the outer coiled tubing at one end of an ICCT section, as for example an upper end. However, it is anticipated that an outer coiled tubing would have walls that were too thin and would not be of sufficiently uniform cross section, in most embodiments, to function well as an expansion chamber. In addition, an outer coil inside surface would likely be too rough to serve as an effective sealing surface. A simple extension of an outer coil would be better provided by a polished pump barrel connected between two outer coiled tubing ends of two ICCT sections. Such barrel would have the inside diameter of the outer coil and extend for a sufficient length to provide an expansion-chamber for the inner coil when raised to working temperature.

A single expansion chamber, as defined by an extension of the outer coil, would be both wet and dry. That is, the chamber would fill with steam initially, before the inner coil expanded, but the steam would be largely displaced by centralizers and insulation as the inner coil expanded up the chamber. (Centralizers are attached to and move with an inner coil. Insulation is pushed or pulled along by centralizer movement.) To keep the insulation dry and within its design insulation parameters, a single chamber design could incorporate a sliding seal attaches to the moving end of the inner coil, presuming the availability of seal technology that meets the working temperature and pressure requirements. The seal would seal against and wipe off steam in the chamber while moving within the sleeve as the inner coil expanded, to prevent the insulation from becoming wetted. Alternately or in addition, methods might be adopted to limit, contain and/or remove wetting of insulation or of annular space which was either residual or permitted.

Preferred embodiments of an expansion joint for the initial prototypes have taken a more elaborate dual chamber design. The joint of preferred embodiments comprises two chambers in series, a wet chamber and a dry chamber. Each chamber extends for approximately the length required for thermal expansion of the inner coil. The two chambers are separated by a fixed seal chamber. In preferred embodiments sealing elements are assembled into a seal stack and fixed relative to the joint. A moving extension mandrel is attached to the inner coil, preferably the downhole inner coil where expansion best takes place. The extension mandrel extends through the dry chamber, through the seal chamber and into the wet chamber and slides relative to the fixed seals. This extension mandrel may be polished and is preferably fabricated from material sufficient to ensure that the mandrel retains a true straight stiff configuration.

Upon heating, the inner coil expands into the dry chamber, carrying with it attached centralizers and associated insulation material. Steam, coming from the upper wellhead, passes into the upper wet chamber of the joint and from thence into the extension mandrel. The seal section prohibits steam from passing from the wet chamber into the dry chamber, or at least to an impressible degree. Rather, steam passes into the wet chamber, into the extension mandrel and into the lower inner coil. Upon heating of the inner coil, the thermal extension mandrel attached to the lower inner coil moves up the wet chamber as the inner coil expands up the dry chamber. The seal maintains a sliding sealing engagement with the extension mandrel as it moves.

The inside diameter of the dry chamber should be approximately the same as the inside diameter of the outer coil, since both bores provide for a sliding passage for the inner coil and attached centralizers. The dry chamber could comprise an extension of the outer coil.

The inside diameter of the bore of the wet chamber, sometimes referred to as defined by a pump barrel, preferably provides close sliding engagement with the extension mandrel. The interior of the wall of the wet chamber, or pump barrel, may incorporate an annular space for insulating purposes. According to the above design, by virtue of the seal compartment the dry chamber does not become wetted by the steam through expansion and retraction of the inner coil.

In the embodiment of a thermal expansion joint (TEJ) or polished bore receptacle (PBR) illustrated in FIGS. 6, and in particular FIG. 6B, a two stage seal arrangement is taught to enhance reliability of the seals in the seal chamber. A radial port 53 between two seal stages 54 and 55 further assists in passing steam that might leak past first stage seal 55 into the region external to the joint. Such port assists in keeping steam from passing into the ICCT insulation space 63 of the dry chamber 59. The secondary seal stage 54 also helps to prevent leaked steam (and/or any produced fluids from the well) from passing into the insulation space 63 provided in the dry chamber 59. Housings and fittings of the expansion joint would include elements to join to the outer and inner coils of upper and lower ICCT sections (or the wellhead.)

The outer coil of both the upper and lower ICCT sections would be fixedly joined, as would the inner coil of one, preferably the upper, section. The inner coil of the other section, preferably the lower, would be attached to an extension mandrel provided for sliding engagement within the expansion joint seal section and pump barrel section.

Figure 12:
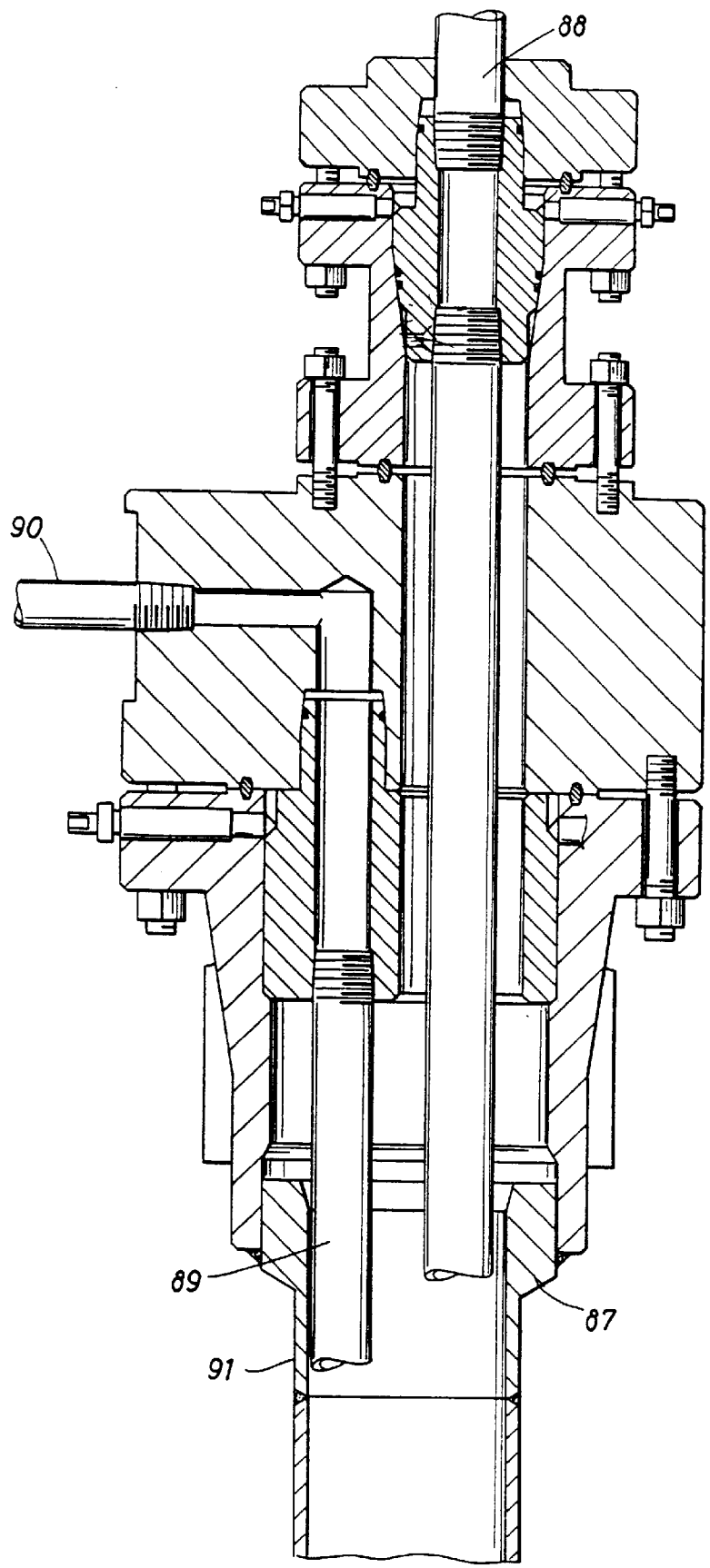
FIG. 12 illustrates in cross section a dual completion wellhead applicable for a single well producing while operating insulated coiled tubing.

FIG. 6A illustrates connections appropriate for a thermal expansion joint to be joined to a wellhead, as for instance a dual completion wellhead of the type illustrated in FIG. 12. In embodiments that require an expansion joint, the first expansion joint would preferably be placed between the wellhead and the uppermost ICCT section.

FIG. 6B illustrates a central section of a thermal expansion joint, which could be the central section of the joint for which FIG. 6A represents its upper end. FIG. 6B illustrates, in particular, the seal section of a joint as it connects between a lower dry chamber 59 and an upper wet chamber 67 of the joint. FIG. 6B also shows a polished extension mandrel 62 passing through a central seal section of the joint.

FIG. 6C illustrates a lower end of an expansion joint, showing a means for connection of the joint with a lower ICCT section as well as a connection of an ICCT inner coil with an extension mandrel. In the embodiment illustrated in FIG. 6C the outer coil 1 of the lower ICCT section forms part of the wall of the dry chamber 59 of the expansion joint.

FIG. 6D illustrates a means for connection of an upper ICCT section, comprising an outer coil 1 and an inner coil 2, with an upper end of a thermal expansion joint. Such joint could comprise the second expansion joint located downhole in a particular application, as at location 50 or 50' of FIG. 10.

Fusion welded adaptor pieces, such as adaptor element 57, may be incorporated in the joint design, such as to terminate ends of pump barrel 64 that comprises the wet chamber 67 of the joint, and to terminate ends of the sleeve section that comprises the dry chamber 59 of the joint. Adapter 57 may be threaded at one end to serve to energize primary seal 55 and secondary seal 54. Threaded connection means 65 and 66 may be employed for connecting upper ends of the outer coiled tubing and the inner coiled tubing, respectively, of a lower ICCT section. Such threaded connection means might avoid the need for welding at the wellsite so that an expansion joint could be connected between ICCT sections by screw threads. Since coiled tubing strings cannot be rotated relative to each other during installation, the housing of the expansion joint would appropriately use both left handed 61 and right handed 60 threads to achieve rigid and seal tight connections at the site. FIG. 6C illustrates that inner coiled tubing 2 and outer coiled tubing 1 may be welded to fittings that are threadedly connected to extension mandrel 62 and the joint housing, respectively.

Dry expansion cavity 59 inside the joint permits movement therein of the inner coiled tubing string 2, as well as its attached centralizers 3, wiper 5 and associated insulation. Cavity 59 is preferably located on the lower end of the joint when installed in a well. This orientation helps to prevent insulation materials from migrating by gravity and filling cavity 59. The moving end of the inner coiled tubing string preferably carries wiper ring 5 of a material suited to the local temperature. The ring minimizes decompaction loss of finely ground or powder insulation which might result during attachment of the ICCT section to the expansion joint. The inclusion of an insulating cavity 58, such as air filled insulating cavity 58 illustrated in FIGS. 6A, 6B and 6D, could be incorporated into the body of the expansion joint, and in particular into a pump barrel comprising a wet expansion chamber, as possible means to reduce heat loss in service.

To review FIGS. 6 in more detail, FIG. 6A illustrates a top fitting of a polished bore receptacle or thermal expansion joint adapted to connect through a dog nut into a wellhead completion. Top fitting 68 preferably includes a tapered thread. Top fitting 68 connects, as by welded connection, to pump barrel 64 which comprises the wet chamber of the joint. Pump barrel 64 may have a vent to atmosphere 72. Such vent to atmosphere is particularly relevant for a thermal expansion joint attached adjacent the wellhead. Such a vent to atmosphere might be omitted for thermal expansion joints placed within the well that might come into contact along their outer surface with well fluids.

FIG. 6B illustrates pump barrel 64 welded to adapter 57 at a central portion of the thermal expansion joint. Polished extension mandrel 62, illustrated in FIG. 6B, is closely received within pump barrel 64. Wipers 73 would preferably be included along the outside surface of extension mandrel 62 for wiping against the inside surface of pump barrel 64. FIG. 6B illustrates primary seals 55 and secondary seals 54. FIG. 6B also illustrates spacer 56 placed between the primary and secondary seals. The chamber holding spacer 56 may be provided with a bleed port 53. Bleed port 53 would encourage steam that managed to pass primary seal 55 to exit the thermal expansion joint. Secondary seal 54 comprises a backup seal to help ensure that steam does not impressibly pass into annular space 59 which comprises the dry chamber of the joint.

FIG. 6C illustrates the lower end of a thermal expansion joint. Polished extension mandrel 62 is illustrated as moving within chamber 59. Mandrel 62 is connected via thread 66 to a fitting welded to inner coil 2. Centralizers 3 and wiper ring 5 are shown connected to inner coil 2. In FIG. 6C inner coil 2 and extension mandrel 62 are shown at their furthest extent within the thermal expansion joint. In this position centralizers 3 have reached a narrowing of chamber 59 limiting their further progress. Chamber 59 has become largely filled with insulation as a result of the expansion of inner coil 2 and centralizers 3 within the joint. Preferably, expansion chamber 59 remains dry by virtue of the primary and secondary seal arrangement.

FIG. 6D illustrates the attachment of a thermal expansion joint to a lower end of an upper ICCT section. In this embodiment outer tubing 1 and inner tubing 2 are connected at their lower end by weld fitting element 72. Fitting 72 is connected by further weld to adapter element 69 having a threaded end. Adapter 69 would preferably include left handed thread 61. Adapter 69 is threaded into unit 70 terminating upstream in right handed thread 60. Right handed thread 60 is provided for threaded engagement of box connection 73 attached to the upper end of pump barrel 64. Pump barrel 64, comprising the housing of the wet chamber of the thermal expansion joint, and having its insulation chamber 58, is illustrated connected, as by weld, to box connection 73.

It is unclear whether the density of the insulation in the annular region between the coils of an ICCT undergoes a net increase or decrease by virtue of the phenomena of the thermal expansion of the inner coil. The effect is probably de minimis. The insulation would tend to occupy a greater volume by virtue of the expansion of the inner tubing in the longitudinal direction but would tend to occupy a slightly diminished volume by virtue of the expansion of the inner tubing in the radial direction. The extent to which the two factors would cancel each other out is uncertain. Successful operation has shown that finely ground perlite insulation performs within its specifications subsequent to expansion of an inner coil in a joint.

Method of Use of Continuous Insulated Tubing

Continuous insulated tubing is delivered to a job site on one or more spools. These spools, transported over a road system, will have a diameter of 6 meters or less and preferably 4 meters or less. A plurality of spools may be needed if the insulated tubing is to be connected in segments, as with thermal expansion joints.

The insulated tubing, designed to be injected in a bore, will have a maximum outside diameter of 10 inches. Far more likely, today, insulated tubing will have a maximum outside diameter of 3 or 4 inches, especially if the tubing is to be used downhole in an oil/gas well environment.

Figure 11:
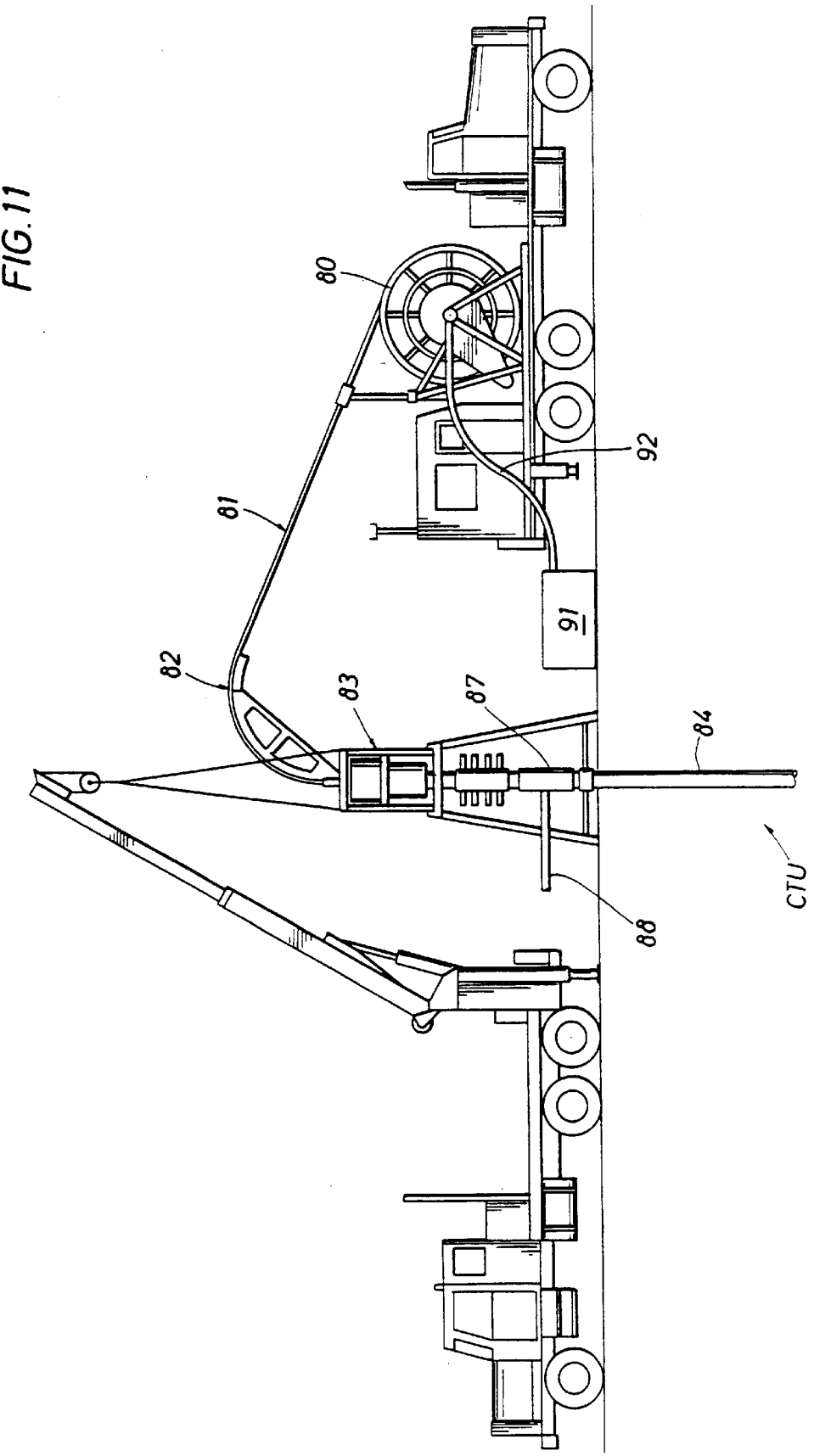
FIG. 11 illustrates apparatus for use with insulated coiled tubing.

FIG. 11 illustrates a coiled tubing unit (CTU) that could be used to insert insulated coiled tubing down a wellbore. Spool or reel 80 contains insulated coiled tubing 81. The tubing is reeled over gooseneck 82 and injected by coil tubing injector 83 into wellbore 84. Appropriate wellhead completion equipment will exist for running in the well, such as a BOP.

Figure 10:
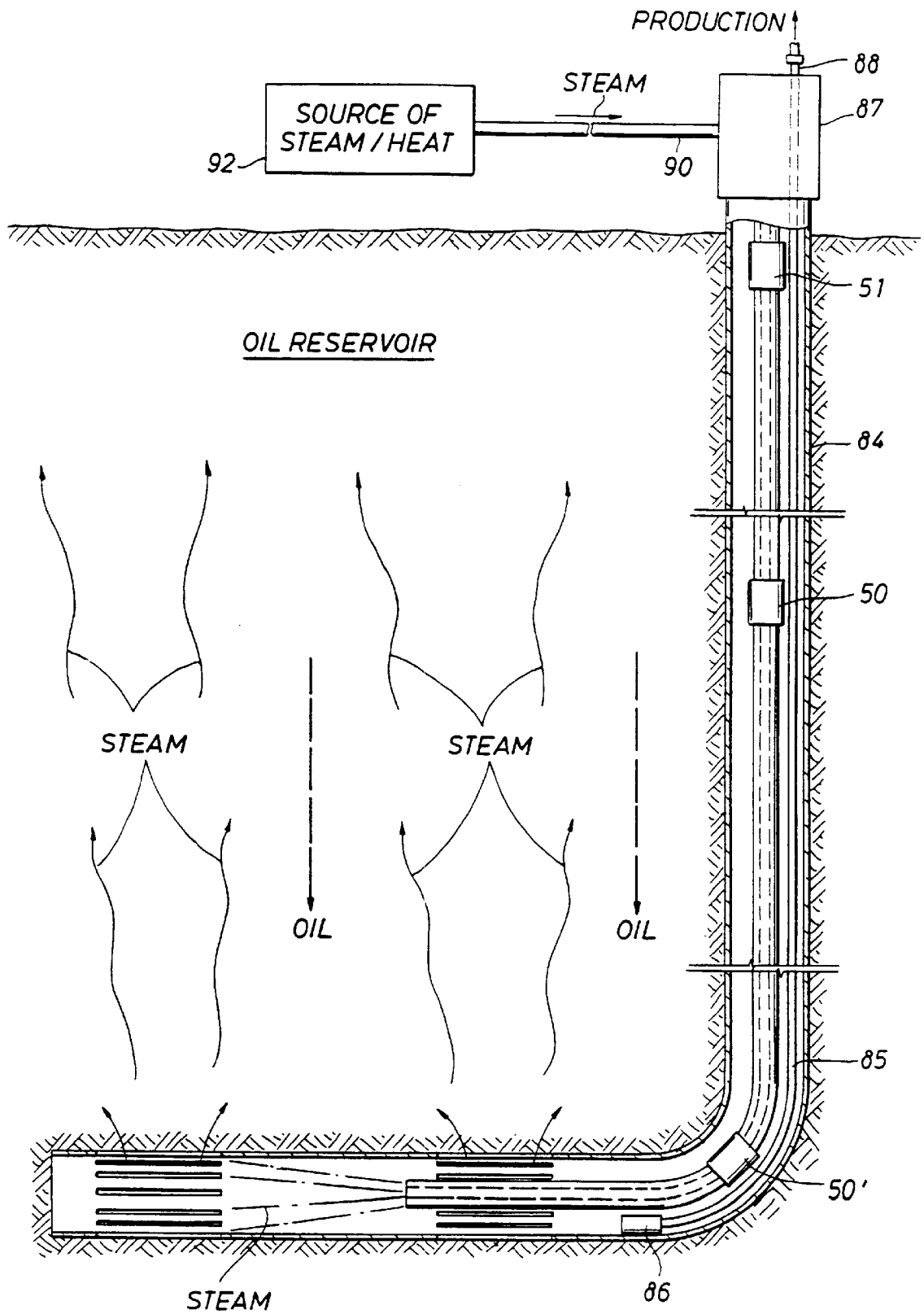
FIG. 10 illustrates the downhole use of the invention as discussed in the SW-SAGD patent application.

In order to practice heat assisted production of hydrocarbons and minerals from a single wellbore, production tubing 85, and possibly associated pump 86, may need to be run into the wellbore, as illustrated in FIG. 10 and in particular as per the SW-SAGD patent application. An appropriate dual completion wellhead 87 may be connected at the surface. Such a wellhead 87 is illustrated in FIG. 12. In wellhead 87 production from the well is conducted through fluid passageway 88. Heat, or steam, is conducted down the well through fitting 90 and down cavity 89. Wellhead 87 shows sub 91 secured to wellhead 87. Sub 91, preferably, would be secured to an upper thermal expansion joint in turn secured to the insulated tubing. Alternately sub 91 might contain fittings for direct securement to the insulated tubing.

FIGS. 5, 10, and 11 illustrate a source of heat, or steam, 91 and mechanism 92 for its maintenance and delivery to a wellhead 87. If the insulated coiled tubing were to remain suspended from a tubing injector during operations, which would require a differently designed dual completion wellhead 92, heat or steam could be supplied to the tubing through fittings attached to reel 80, as in FIG. 11.

History of Design and Testing of First Prototype, Method of Use and Successful Results Significantly increased production flow from a Cactus Lake, Saskatchewan pilot project has been achieved using the new invention in a process called single-well steam assisted gravity drainage (SW-SAGD), as more fully described in the SW-SAGD patent application. A crucial success factor was keeping the steam at 300 degrees Celsius at pressures reaching 9000 kpa (1,305 psi) while working within a wellbore less than seven inches wide (internal diameter). To meet the challenge, a prototype coiled dual-tube string was designed to accommodate a thin layer of insulation between the two tubings.

The concentric tubing consisted of a 1¾" ninner and 2⅞" outer coiled tubing separated by loose-fill insulation and specially designed composite-construction centralizers. This ICCT required the development of a new, low thermal conductivity ceramic paste, the design of thermal expansion joints utilizing advanced seal technology suitable for a high pressure and greater than normal steam temperatures of 350° C. (662° F.) and the application of modern orbital welding processes for ICCT welded connections. The experimental steam injection process consisted of continuous steam injection and oil production from the same well bore.

The following sections detail the research and development associated with the first prototype ICCT, including the results of insulation heat loss and frictional resistance laboratory testing and shop trial assembly and structural integrity testing. Also described in detail is the construction of the first prototype ICCT string in a suspended vertical well and the installation of the ICCT prototype for the first experimental trials relating to use of the instant invention in a particular heavy oil lease.

Computer simulation of the thermal stimulation temperature for the project field indicated that this operation required the delivery of high quality steam to the oil-bearing formation as per the SW-SAGD patent application. To achieve that result, the heat transferred by the injected steam to the fluids in the vertical casing annulus had to be significantly limited. To satisfy this requirement, the steam, at a design injection temperature of 350° C. (662° F.), had to be injected through tubing which was insulated to minimize heat loss and steam condensation on its way to the oil producing zone.

The use of conventional insulated production tubing was initially considered to serve as the steam injection string. This proved, however, too costly and the tubing tool joints would be too large in OD for the well bore size, given the thermal tubing size required to transport the design steam flow. The annular space that would remain within the existing casing size would not enable clear passage for the required downhole pump. Further, the increased thermal conductivity or "thermal wick" heat loss and resulting thermal reflux effect through the numerous threaded connections used with conventional jointed tubing was of concern.

For the needs of this operation, a concentric coiled tubing string that could be insulated was postulated. This possibility presented several challenges. One was to design, test and construct, for the first time, two coiled tubing (CT) strings which would form a concentric assembly, thereby providing an annulus for insulation. A second challenge was, with the above annulus filled with a suitable insulation or any otherwise insulated coiled tubing composite, to provide a net thermal conductivity equivalent to or lower than that exhibited by existing insulated, but segmented, production tubing. This latter constraint meant that, for competitive thermal performance, the overall thermal conductivity of the composite would be limited to values in the range of 0.03 to 0.05 Btu/hr-ft-F.

Insulation Selection

Computer data base searches were performed on the thermal properties of available insulating materials that might lend themselves to be attached to tubing or to be readily installed in the annulus of a concentric coiled tubing of approximately one mile in length. A further constraint of the initial insulation selection was to sustain the high temperatures existing at the surface of the inner coiled tubing. Insulation that might be used for less stringent requirements, or with a single tubing length, such as multilayered insulation of asbestos or similar materials, was ruled out for the first prototype due primarily to the exigencies of time and the complexities involved in wrapping these materials continuously and consistently. Also of concern for concentric tubing was developing the skill to insert not only an inner tubing length into an outer length but to do so without damage to any insulation inserted in the annulus over the long tubing lengths involved. Liquid insulation materials, which would produce a foam upon solidification, were reviewed for their ability to insulate and/or fill an annular space, or alternately to simply line the inside of an outer tubing. They were not selected for the initial prototype because they did not best satisfy the low thermal conductivity or the high working temperature design specifications for the particular initial job comprising the first experiment. There was also the factor of the time delay and the learning curve associated with any possibility of insulation damage and/or excessive degradation as a result of spooling the string on a transport or working coiled tubing unit (CTU) reel. Several trials might be required to perfect these designs. For the initial test, time was of the essence. Therefore, time restraints associated with the operational need for the first prototype dictated a need to minimize experimentation and led to selecting a loose-fill insulating material, derived from explosively expanded volcanic rock and known as "perlite", selected for its known low thermal conductivity, high service temperature and apparent potential for being installed in an annulus of a concentric CT.

Tubing Size and Centralization

Theoretical calculations of steam flow pressure drops and radial heat losses for an ICCT to permit the passage of a 4¼ inch OD pump within a 8⅝ inch casing, resulted in the selection of a 1¾ inch CT for the inner tubing and a 2⅞ inch CT for the outer tubing. See FIG. 2A and 2B. The absence of tool joint upsets made possible by using a coiled tubing composite, as opposed to jointed thermal tubing, was a major economic driving factor for the ICCT development, since a larger than 8⅝ inch intermediate casing size would otherwise have been necessary to accommodate the required bottomhole pump.

In order to optimize a continuous insulating jacket around this inner tubing, it was accepted as a design requirement to essentially maintain the inner tubing concentric with the outer CT. The required tubing sizes meant that there was a radial annular gap of less than ½ inch available for insulation. This was the gap that became available in which to insert a centralizer which could sustain high concentrated radial forces, resist sliding relative to the inner tubing and prevent excessive "thermal wick" heat losses. The design and construction of these centralizers is described in greater detail below. A prototype of the first design is illustrated in FIGS. 4A–4G.

ICCT Centralizer Design

To maintain the inner CT concentric with the outer tubing, special centralizers were designed which could resist the mechanical stresses induced during the initial assembly -of the ICCT string and future coiling for maintenance or workover operations as well as the thermal stresses from thermal expansion induced under operating conditions. Since no immediately known elastomeric material exhibited the required strength at the 350° C. (662° F.) or higher service temperatures, a composite steel and ceramic centralizer design was adopted. This design consisted of a hinged shaft collar and screwed connection for ease of assembly. See hinge 13 and screw connection 14 of FIG. 2B and 4A.

Using modern numerically controlled (NC) fabrication methods, the outer periphery was machined to a convex or "crown" profile 16 and contained axial slots 17 which resemble a chain sprocket with truncated teeth 18. See FIGS. 4. This effectively reduces the area of contact with the outer tubing as well as permits the axial flow of granular insulation such that its optimum packing density could be achieved and any voids created from compaction of the insulation can be filled with make-up insulation sifting past the centralizers from above during assembly of the ICCT string. The crown also serves to facilitate the insertion of the inner CT and avoids gouging of the inner wall of the outer tubing. Excessive localized contact stresses are also avoided with the crowned profile particularly when the ICCT string is subjected to plastic bending during spooling onto a transport reel during installation in a horizontal steam injection well.

The axial slots permit the passage of gases, such as argon, which might be used to purge the annular space for possible further reduction in thermal conductivity, or for drawing a vacuum in the event that an ultra-low thermal conductivity was to be incorporated in the insulating jacket design. As shown from the ICCT heat loss test cell results, however, purging of interstitial air with argon did not appear to decrease the thermal conductivity in spite of its lower heat conduction coefficient.

In addition, the slots would enable diffusion of unwanted gases towards strategically placed "getters", such as hydrogen, which unwanted gases might find their way into an ICCT annulus in critical sour well applications or in the event of some hydrogen generation resulting from the steam injection process. Finally, the slots enable retention of atmospheric pressure in the insulation annulus along the entire ICCT string length by means of a single vent valve at surface.

Radial heat conduction was reduced to less than 2.0% of what would have been suffered with an all-steel centralizer design by lining the inner surface 17 of the centralizer with a newly developed ceramic paste. The formulation of this new material precluded disbanding between the ceramic liner and steel centralizer due to differential thermal expansion by exhibiting a thermal coefficient of expansion comparable with that of steel. The special ceramic paste also featured a coefficient of thermal conductivity, "k", which was less than that of any ceramic paste products commercially available at the time of the ICCT development. Such ceramic paste is now available from Aremco Products, Inc., Ossining, N.Y., as Ceramabond L7050. See FIG. 4 and Table IV. Ceramabond L7050 from Aremco is a silica-filled ceramic based compound which sets at room temperature and, following a short heat curve cycle at 250° F., becomes extremely durable. It can be applied by syringe, squeeze tube or automatic dispensing equipment. Containers come in pint, quart and gallon sizes.

A groove 19, almost equal in width to the centralizer, is machined in the inner circumference flanked by two beveled and knife-edged shoulders 20 to confine the ceramic paste and maintain its shape and strength under high radial compressive and axial shearing loads. As well, these chamfered edges conveniently provide two parallel guiding edges to facilitate troweling the ceramic paste to a flush inner surface with constant ID equal to that of the OD of the inner tubing. This is an important feature since it avoids any local stress concentrations on the ceramic surface which would result in fracture or chipping of the insulating liner. Avoiding local high spots on the ceramic liner surface also insures proper sealing of the centralizer on the inner tubing. The results of measured incremental heat loss and increased overall ICCT thermal conductivities due to the insulated centralizers are presented below.

ICCT Thermal Conductivity

The first phase of ICCT development involved the determination of thermal conductivities and ICCT heat loss resulting with the use of a loose-fill insulation. Before commencing with the design and construction of an ICCT heat loss test cell to perform actual heat transfer measurements in the laboratory, calculations were performed to obtain theoretical heat transfer estimates.

ICCT Heat Loss Test Cell

To measure actual heat losses and overall thermal conductivities of full-sized ICCT specimens, a special heat transfer test cell was designed and constructed. See FIG. 7. This enabled heat loss measurements at thermal boundary conditions simulating the worst case vertical orientation and actual service temperatures. For example, the design temperature difference between the 350° C. (662° F.) injected steam and return fluids at surface was approximately 200° C. (392° F.). Heat loss measurements were made to establish the thermal wick effect of the centralizers, the variation with temperature of the thermal conductivity of the insulation as well as that of different insulation grades and packing densities, the benefits, if any, of purging the air in the annulus with gases of lower conductivity such as argon and the effects of non-concentric ICCT configurations resulting from the residual curvature of the inner tubing. Heat loss measurements were also made to factor out the natural convection and radiation heat transfer components.

Figure 7:
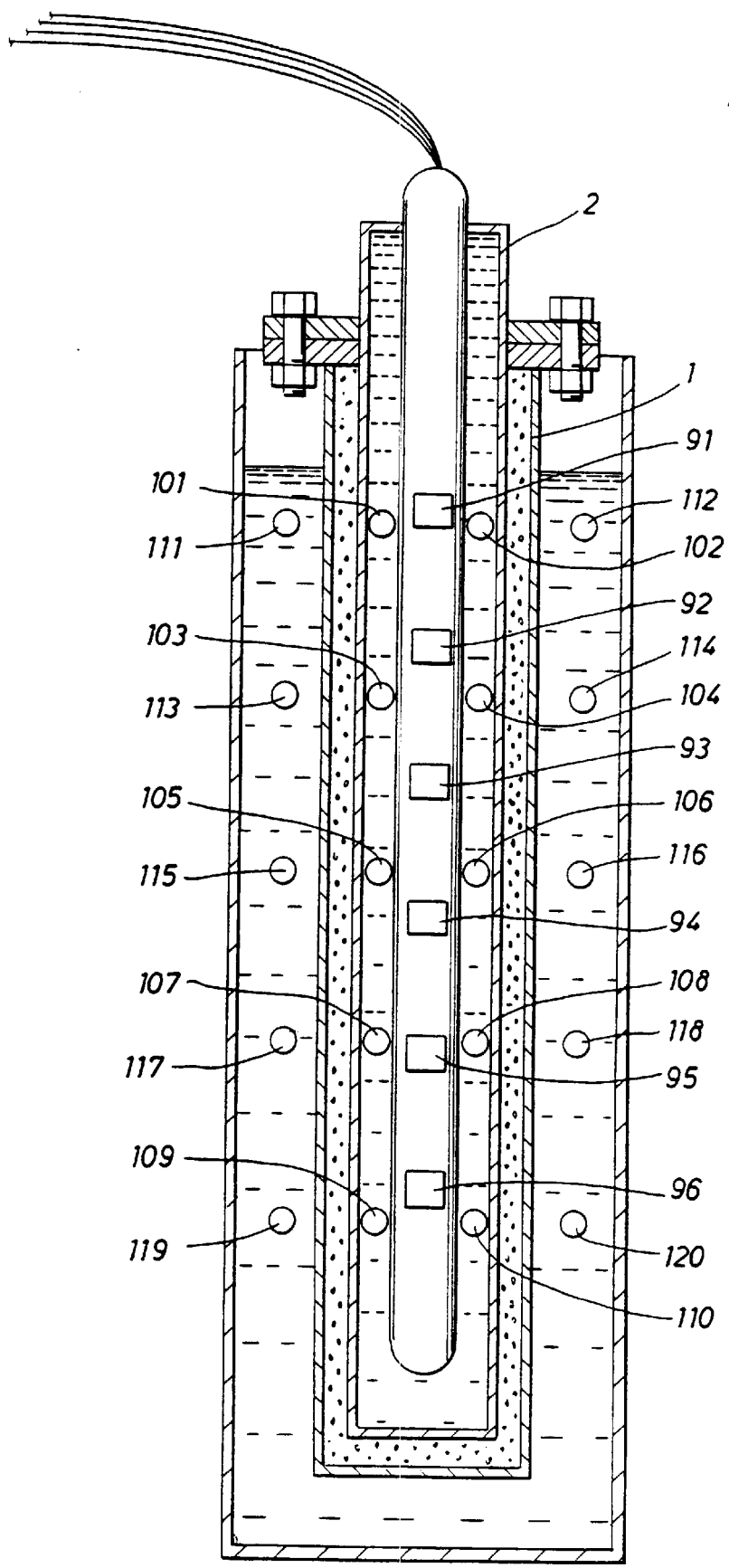
FIG. 7 illustrates a thermal performance test apparatus for insulated coiled tubing.

FIG. 7 shows a schematic diagram of the ICCT heat loss test-cell. The ICCT test specimen is six (6) feet in overall length with the central four (4) feet comprising the heat transfer section. Six (6) precision extruded heating elements are inserted in the inner 1¾ inch tubing filled with a high temperature nonreactive heat transfer oil. Heaters numbered 92 through 95 are used to heat the fluid to the specified steam test temperatures. Heaters numbered 91 and 96 are used to prevent axial heat flow by adjusting their output to eliminate temperature gradients in this direction.

Precision thermocouples numbered 101 through 110 measure the temperature distribution of the inner tubing 2 with the thermocouple leads passing through a sealed flange connection at the top of the ICCT specimen. The 2⅞ inch outer tubing 1 is in turn inserted in a 10 inch casing also filled with a heat transfer fluid. Thermocouples numbered 111 through 120 measure the fluid temperature specified as the outer thermal boundary condition which represents the bulk temperature of the fluid in the casing annulus which is assumed equal to that of the produced fluid mixture of oil and water returning in the non-insulated production tubing.

To reduce the forced convection heat transfer resistance at the outer surface, the film coefficient at this interface was increased by circulating the fluid in the outer casing through an insulated pipe loop using a high temperature rated pump. To obtain or perform thermal conductivity measurements, the heaters were adjusted until the desired temperature difference, ▲T, reached a steady state condition. Since the measured power consumed by the heaters is representative of the heat loss across the ICCT specimen, the overall thermal conductivity could be calculated using the Fourier law of heat conduction.

Results of Thermal Conductivity Measurements

Numerous ICCT heat loss laboratory specimens were prepared and tested of which only the key results are presented here. Test Specimen No. 1 consisted of the base case for comparison of all other results. This specimen was constructed with the inner 1¾" CT concentric with the outer 2⅞" CT and the annulus filled with granular loose-fill AHW grade perlite insulation of lowest theoretical thermal conductivity and compacted to its optimum density. The annulus contained air held at atmospheric pressure and no centralizers were inserted. Since the thermal conductivity was known to be a weak function of temperature, heat loss measurements were made at three different thermal boundary conditions representing the extreme design values of operation specified for the new continuous steam injection and oil production process.

The second ICCT laboratory heat loss specimen was similar in design to that of Specimen No. 1 except that the air in the annulus was displaced with argon gas after drawing a vacuum in the annulus. Specimen No. 3 was designed to measure the radiation component of heat transfer. It was similar in design except that the annulus consisted of a vacuum only so that there would be no heat transfer by conduction or natural convection. Specimen No. 4 measured the incremental increase in heat loss as predicted theoretically due to any eccentricity or radial displacement of the inner tubing relative to the outer tubing. For this specimen, the inner tubing was displaced until physical contact was made between the inner and outer tubing over the entire length of the test specimen after which the remaining annular space was filled with loose fill insulation.

To measure the "thermal wick" effect of the centralizers, Specimen No. 5 was constructed with several closely spaced centralizers to obtain a measurable change in heat transfer. Since calculations of critical Grashof Numbers indicated natural convective loops would be established in the vertical section of the ICCT pilot well but the degree of convective flow resistance afforded by the loose-fill insulation was difficult to predict, Specimen No. 6 was constructed similar to No. 1, except that a vacuum was drawn in the annulus after filling with insulation. (The Grashof Number represents the ratio of buoyant to viscous forces and is defined in the Nomenclature). To measure the effect of the insulation in reducing the convective heat transfer component, Specimen No. 7 was designed and constructed with only air the annulus. Subtraction of the heat transfer conducted and radiated through the air annulus from the overall or total heat transferred, enabled calculation of the convective heat transfer component. Finally, in an effort to eliminate completely any heat transfer associated with free convective loops, Specimen No. 8 was constructed-using a special grade of loose-fill insulation which would provide sufficient air flow resistance to preclude the formation to convective loops.

Examples of the key heat transfer test results, from which the coefficients of thermal conductivity were calculated, are shown in Tables I to III.

Discussion of Heat Loss Test Results

Table I illustrates the results for the base case heat transfer test which involves a concentric full sized ICCT specimen, the AHW grade of perlite insulation, no centralizers and air in the annulus. It can be seen, that the values of "k" obtained satisfied the basic ICCT thermal design criteria. Upon closer analysis of this data, however, it became clear that improvements in the insulation design were required at the higher service temperatures. As well, the thermal wick effect of the centralizers was not included in these results nor was the effect of a non-concentric ICCT configuration.

Effect of Temperature on Overall "k"

It can be seen from the heat transfer test results of Table I, that at the lower mean temperatures representing thermal boundary conditions specified for the horizontal or oil producing section of the steam injection well, a thermal conductivity for the full sized ICCT base case test specimen was measured in the range of 0.03 to 0.04 Btu/hr-ft-F. The thermal conductivity for the 275C. (525F.) steam injection well, is seen to be somewhat higher as a result of a small increase in thermal conductance with increasing temperature for the loose-fill insulation material.

The thermal conductivity measured for the vertical section of the steam injection well, for which ▲T is the highest, is seen to be appreciably higher than what might have been expected from an increase in thermal conductivity for the loose-fill insulation alone. From the heat loss data shown in Table I, at a mean temperature, $T_m$, greater than about 200° C. (392° F.) a marked increase in $k_m$ was obtained unlike previously published data from the Perlite Institute.

Since it was at first suspected that this was due to experimental error attributable to possible axial heat losses at the high test temperatures, tests were repeated several times with similar results. Since the establishment of natural convective loops was also suspected as a cause for the higher effective thermal conductivity, an ICCT test specimen was designed for which a vacuum was drawn after filling the annulus with loose fill insulation. This resulted in values of '$k_m$' in closer agreement with values published by the Perlite Institute at these temperatures albeit these results are for air in the annulus. The measured 'k' at $T_i$=350C. (662F.), for example, reduced to 0.0403 Btu/hr-ft-F compared to 0.0546 Btu/hr-ft-F for air in the annulus. At the lower temperatures, little difference was obtained for the base case ICCT specimen containing air and one with the air evacuated. For example, at $T_i$=200C. (392F.), the measured values of "k" were 0.0339 Btu/hr-ft-F and 0.0357 Btu/hr-ft-F respectively.

This confirmed the existence of free convection loops at the maximum steam injection temperatures since buoyant forces are larger at the higher temperatures and for an ICCT string in the vertical orientation. This increased heat transfer due to natural convection was effectively eliminated with the use of a special grade of loose-fill insulation which offered a greater resistance to fluid circulation in the ICCT annulus thereby preventing the establishment of free convection flow loops. The need for intermittent barriers to prevent air circulation in the insulation annulus of vertical ICCT sections was therefore also eliminated.

From the heat loss experimental data, a linear relationship for the increase in overall ICCT thermal conductivity as a function of mean temperature, was derived and is given by:

$$k_m = 0.018(1+0.005778 T_m) \text{Btu/hr-ft-F}$$

The coefficient of thermal conductivity, '$k_m$', is based on the mean temperature $T_m = (T_i+T_o)/2$ of the insulation material, with $T_i$ representing the temperature of the inner tubing surface and $T_o$ that of the outer tubing surface measured in degrees C. From this equation, which is based on measured heat loss data, the highest thermal conductivity for the ICCT string at the maximum design temperature of 350° C. (662° F.) and at a mean temperature of 250° C. (482° F.) should therefore be 0.044 Btu/hr-ft-F, in the absence of centralizers.

Effect of Centralizers on Overall "k"

The first row of Table II shows the results of the experimental heat transfer tests incorporating centralizers for the inner tubing spaced at 1-foot intervals in the ICCT test specimen. Since the incremental heat loss attributable to the centralizers was expected to be low, a relative short spacing was selected for the laboratory testing in order to obtain more readily measurable differences in heat loss. This spacing did not necessarily represent actual spacings to be used in the ICCT prototype construction.

Although a "k" value of 0.0532 Btu/hr-ft-F for a spacing of only one foot, was not objectionable in an absolute sense since it would have been acceptable in light of the ICCT heat loss design specifications, it represented a large relative increase over base case "k" values which do not include centralizers. An empirical expression was therefore derived for the thermal conductivity, kg, to investigate its increase as a function of centralizer spacings which might be more representative of the actual ICCT prototype:

$$k^g = (1/s) (k^o(s-4/3)+(4/3)k^1)$$

The percentage increase for several centralizer spacings, as calculated from this expression, is illustrated in Table II. This shows that the specially designed, low heat conductive centralizers result in an increase in effective thermal conductivity of the ICCT insulation of approximately 10% or less when spaced at intervals of 6 feet or larger.

Effect of interstitial Gas on Overall "k"

As can be seen from the results presented in Table III, purging the insulation annulus with a gas of lower thermal conductivity than air, such as argon, resulted in a negligible change in the measured thermal conductivity of the basic ICCT insulating jacket design. This result not only eliminated the complexities associated with purging the air and replacing it with another gas to be sealed in the annulus during the assembly of the ICCT, but it also showed that the insulating properties are primarily due to the presence of the loose-fill insulating material.

The observation that purging the annulus with a gas other than air having a negligible effect on the overall coefficient of thermal conductivity, would indicate that the low heat loss performance of ICCT strings would be maintained even in the event of foreign gas diffusion into the annulus, providing gas condensation does not take place. Hence, the thermal insulating quality used in the ICCT technology is not expected to degrade in the event the annulus becomes contaminated with hydrogen gas which has a thermal conductivity about seven times greater than air.

This would not be the case in vacuum insulated systems which depend on hydrogen getters to act as infinite gas sinks and to absorb the hydrogen at a much greater rate than its rate of diffusion into the evacuated annulus. Since the diffusion coefficient of hydrogen gas in steel increases rapidly with temperature up to about 100° C. (212° F.) followed by a less rapid increase, the ability of permanently placed getters to absorb sufficient quantities of hydrogen and at a fast enough rate over the life of a thermal tubing string in steam injection EOR applications, is open to question.

Other ICCT Thermal Considerations

Aside from heat transfer aspects, several other important considerations remained to be evaluated with respect to the elevated service temperature of the new technology. These included, thermal expansion and contraction, thermal shock effects and materials performance aspects.

Further thermal consideration in the design of the insulated coiled tubing include adding low emissivity coatings or tubing surfaces to minimize radiant heat loss. In addition, the outer tubing could be heated by electrical induction or resistive heat to further reduce radial heat loss. Further attention to use of the electrical as well as the thermal insulating properties of the composite tubing is intended as electrical sources provide viable sources of heat.

Thermal Expansion and Contraction

Conventional jointed thermal tubing incorporates a prestretched inner tubing to offset differential thermal expansion of the hotter inner tube relative to the colder outer tube in use. The design renders conventional jointed thermal tubing more susceptible to stress corrosion cracking (SCC) failures (specifically sulfide stress cracking, SSC) and contributes to their higher manufacturing costs. Conversely, when the inner tube contracts relative to the outer tube the tensile stresses of the inner tube in conventional thermal tubing designs would exceed the prestress values. This higher stress condition coupled with a reduced temperature would render the inner tubing even more susceptible to SSC.

Such a situation would arise, for example, under well kill conditions which might involve injection of cold water through the inner tubing to the heated formation. Detailed calculations of thermal expansion stresses and buckling instabilities of the inner tubing were therefore performed to investigate the need for one or more separate expansion joints.

Detailed Calculation of Thermal Expansion

Figure 8:
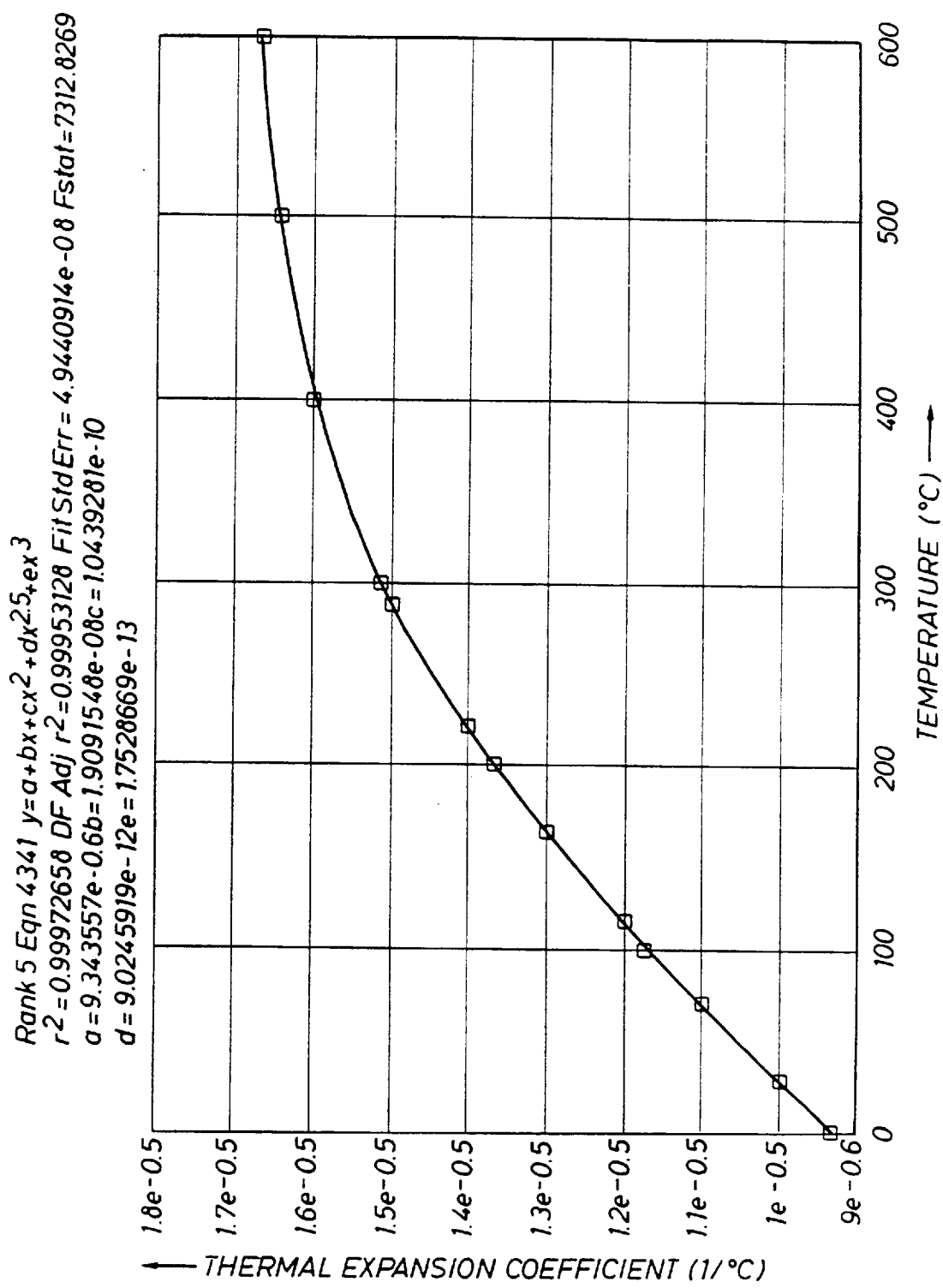
FIG. 8 is a graph showing coefficients of thermal expansion for coiled tubing steel as a function of temperature.
Figure 9:
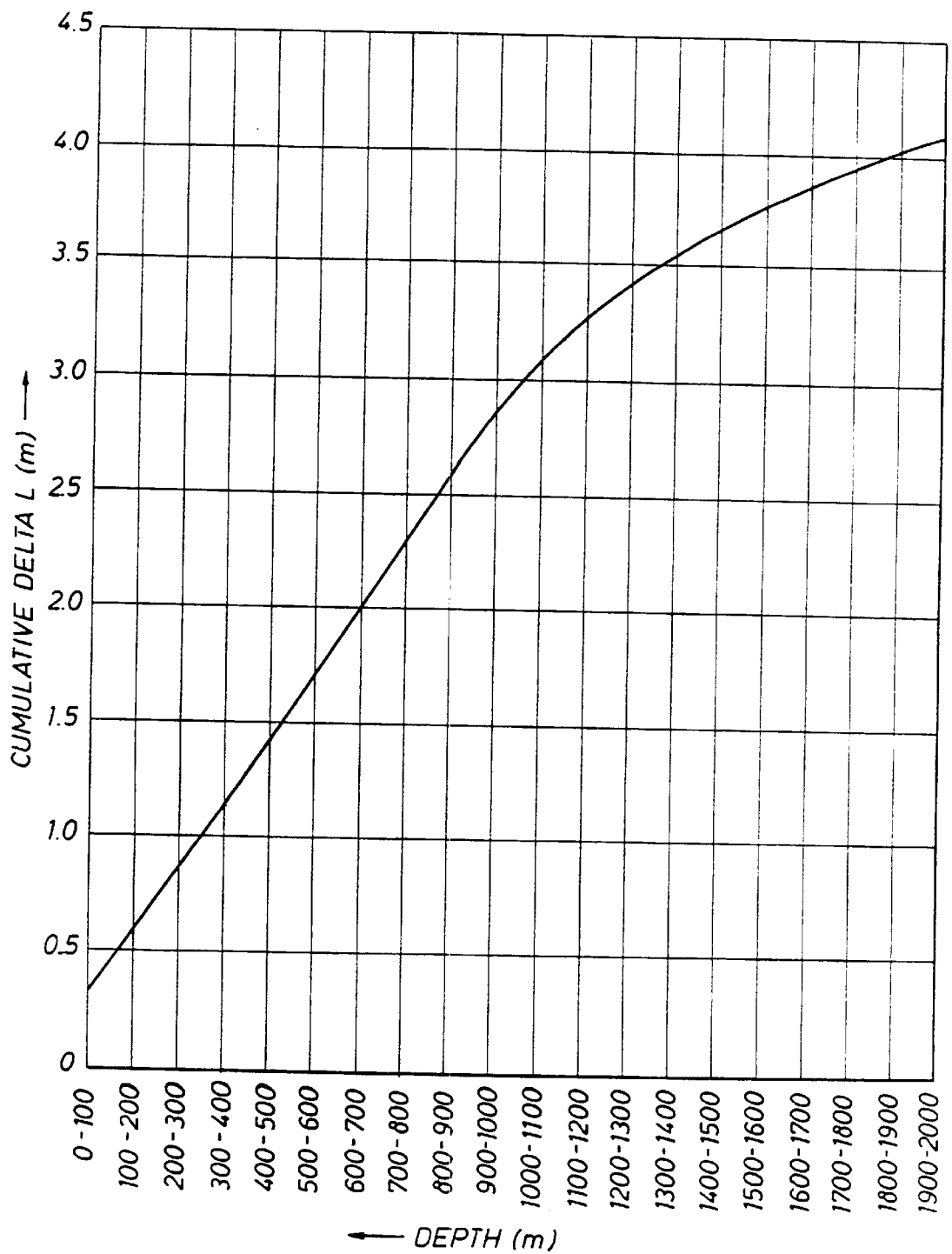
FIG. 9 is a graph showing thermal expansion as a function of well depth.

Since the thermal coefficient of expansion of steels is not a constant as is often assumed, but a function of the temperature, an empirical relation was derived for the coiled tubing steel alloy based on a series expansion as shown in FIG. 8. This function along with the computer simulated temperature profile along the ICCT string, was used in the numerical integration of the local thermal expansion of the inner tube and subsequently plotted as a function of well depth as shown in FIG. 9. From this, it was determined that if separate expansion joint(s) or polished bore receptacle(s) (PBR) were necessary for the ICCT prototype, one PBR would be placed directly below the wellhead assembly and a second PBR just above the well kick-off point. Each PBR would have a thermal expansion capacity of 6 feet and 8 feet respectively and a thermal contraction capability of 1 foot 6 inches to preclude the development of a tensile stress field in the inner tubing under well killing operations.

Material Performance and Selection

Incorporating the assumptions made in the thermal stress analysis, a preliminary analysis was made to see if it was possible that the thermal expansion could be accommodated by the build up of compressive stresses within the inner tubing without exceeding yield values. Several key aspects of coiled tubing material behavior under thermal cycling and elevated temperature operations, however, had not been evaluated for inclusion in these analyses. As well, the possibility of localized buckling or collapse of the inner tubing remained unless the centralizer spacing was sufficiently small. For shorter spacings, the percentage increase of heat loss due to thermal wick effects and the resulting problems associated with thermal reflux effects, were considered to be unacceptable for the initial prototype.

Elevated temperature tensile testing of coiled tubing specimens were performed in the range of 22° C. to 400° C. to determine the change, if any, in some of the mechanical properties. A negligible change in yield and tensile strength was observed, however, the ductility measured by the percent elongation, was sufficiently affected within this temperature range to warrant a more detailed investigation and alloy selection of available coiled tubing steel grades. On metallurgical grounds, an existing coiled tubing alloy containing molybdenum and a more favorable percentage of copper in its chemical composition, was the preferred selection, albeit not necessarily the optimum alloying design for the new ICCT technology. Molybdenum, for example, is a beneficial element for reducing high temperature creep in steels. Addition "fitness-for-purpose" coiled tubing testing is ongoing to assess the materials performance in high temperature steam (both wet and dry) and critical sour environments.

One key aspect of these investigations is to determine if sufficient corrosion allowance has been made in the selection of the wall thicknesses for both the inner and outer tubing. In this regard, it is worth to note that the single well process being developed (see later sections), has a significant advantage in terms of materials performance expectations as well. Because of the dynamic flow loop conditions of this continuous steam injection and oil production process any corrosive species, the high concentrations of corrosive constituents emanating from the heated formation, do not accumulate in the well bore to produce aggressive corrosion environments because they are continually being flushed from the EOR system. High concentrations of corrosive elements have been known to occur with the conventional "huff and puff" steam injection process. Such processes are therefore severely limited with respect to their maximum permissible steam soaking times at which the well is shut in prior to being allowed to flow and produce. Efforts to extend this soaking time to allow for greater thermal energy transfer to the formation, have resulted in aggravated materials degradation problems involving downhole tubular components.

The above considerations and the risk associated with possible structural or mechanical failure of the inner tubing from excessive thermal compressive stresses resulted in the decision to incorporate separate means for thermal expansion of the inner tubing relative to the outer tubing. It is expected that the use of only one PBR may be possible for future ICCT assemblies.

Expansion Joint Design

The ICCT construction preferably incorporates a proprietary high temperature and pressure steam seal design within the PBR developed by and available from Secure Oil Tools Ltd. of Calgary, Alberta, Canada to accommodate the thermal differential expansion, as illustrated in FIG. 6.

This design concept provides the flexibility of placing one or more PRBs or expansion joints at strategic locations along the ICCT string, both with respect to varying degrees of thermal expansion allowance dictated by the temperature profile along the well bore and with respect to placement of hydrogen "getters" which can be incorporated into the manufacture of the PBR.

With reference to FIG. 6, the initial prototype designs of the PBR consists of an inner expansion mandrel 64 assembled inside and structured to pass through an expansion chamber 59 designed to receive and contain the loose fill insulation which would be conveyed along with the inner tubing during thermal expansion. The expansion mandrel of the PBR would in turn extend into an "expansion chamber" 67 designed for minimum heat loss by the use of a insulated cavity 58 with a low emissivity radiation heat transfer surface. The gap width 58 is sufficiently narrow to achieve a Grashof number below a critical value which would prelude the establishment of natural or convective heat transfer loops.

The sealing section, which prevents any steam or hot water from entering the insulation annulus, consists of a long primary seal and a short secondary seal assembled in tandem with a pressure relief port located in the "primary seal housing". See FIG. 6. All sealing surfaces are precision ground, honed and double chrome plated. In order to withstand the combination of higher than normal design steam injection pressure (17 MPa or 2,500 psi) and temperature (350° C. or 662° F.), a special proprietary seal design was utilized. This consisted of a composite construction of high temperature elastomers and compressed graphoil disks to act as containing rings for the more resilient elastomeric sealing material. This sealing system is rated for steam service temperatures of 425° C. (800° F.) and pressures of 20 MPa (3,000 psi).

Threaded premium couplings were welded with an automated orbital welding process for field installation connection to mating couplings similarly welded to the ICCT sections during the assembly stage. Except for the top pin connection into the wellhead and for the bottom threaded box connections of each PBR, all external dimensions of the PBR are flush with the 2⅞" OD of the insulated tubing. This resulted in only one location along the ICCT string where the outside clearance, being reduced due to the presence of a threaded connection, would result in a possible restriction for the passage of a downhole pump. Since the maximum OD of the PBR at the box connections is 3.40 inches, however, sufficient clearance was available for the passage of a 4¼ inch OD positive displacement oil pump inside an 8⅝ inch casing. It is anticipated that all future production model ICCT designs will feature flush connections with the outside diameter of the ICCT which will remove all upsets along the total length of the ICCT string. This represents a major advantage over conventional jointed thermal tubing which contain larger upsets at each tubing thread joint spaced between 30 and 40 feet apart. For an equal size of available pump clearance, the ICCT string design permits the use of a smaller well casing than that required using conventional thermal tubing joints.

To enable field assembly of the lower PBR for which neither the PBR nor the vertical ICCT section should be turned for make-up of this connection, a special "thermal connector" as shown on FIG. 4, was designed and fabricated having right hand and left hand threaded pins with integral seals and seal energizing rings at either end. Finally, each PBR for the ICCT prototype featured a thermal contraction capability of 18 inches to accommodate well workover or kill situations as discussed above.

Frictional resistance

For the assembly of an ICCT string exceeding one mile in length, a major problem to overcome was the frictional resistance imparted by the loose-fill insulation. The possible origins of high frictional forces were between the insulation and the inner surface of the outer tubing and in the regions of the centralizers. The frictional resistance would also be dependent upon the degree of insulation compaction for which an optimum value exists to ensure a minimum of heat loss.

A plexiglass tubing specimen was constructed to aid in the visualization and understanding of friction forces arising from the packing and possible wedging of insulation at the outer perimeter of the centralizers. This specimen also served to observe the effectiveness of the centralizer axial slots from preventing the formation of local insulation voids adjacent to the centralizers. Both laboratory and test well friction force studies were performed to determine magnitudes of frictional resistance and insulation behavior under ICCT assembly forces.

Laboratory Friction Force Measurements

Extensive laboratory testing of frictional resistance as a function of insulation compaction density, centralizer spacing and orientation of the tubing was performed on 20-foot long full sized ICCT specimens. This was the maximum specimen length which could be accommodated by the tilting test frame which in turn was limited to a maximum inclination of 23 degrees from the horizontal. Force measurements were performed with the aid of a computerized data acquisition system and "Labview" software. Two alternative orientations were evaluated for the ICCT assembly program which consisted of simultaneously inserting the inner tubing concentrically into the outer tubing, filling the annular space with loose-fill insulation compacted to the desired density and attaching the centralizers at the correct intervals all in a continuous operation. Ideally, this process would be continued without stopping until the desired lengths of the ICCT sections had been assembled.

For the continuous steam-injection oil-production pilot well, these lengths were between 600 m and 650 m for the vertical section and between 1050 m and 1100 m for the horizontal section for a maximum ICCT length of 1745 m (5760 ft), including the build section. Although extrapolating friction force measurements from 20 foot laboratory specimens to these lengths introduced considerable uncertainty, detailed insight was gained from these tests on the relative effects of inclination, speed of assembly, insulation material, degree of compaction and the ratio of starting to sliding friction forces. It was expected that extrapolations of measured friction forces with the 400-foot ICCT sample assembled in a vertical test well, would provide a more reliable estimate of friction forces to be encountered during the ICCT prototype assembly.

The numerous results from these tests are too exhaustive to be included at length. The main conclusions drawn were that insulation compaction played an important role in the frictional resistances and insulation integrity, the frictional resistance showed a decreasing trend with inclination and the frictional resistance showed a greater sensitivity to speed of insertion of the inner tubing at lower angles of inclination. For example, in one friction test on insulation compaction in the horizontal orientation, a force exceeding one (1) ton (2000 lb.), was required to advance an ICCT section only four (4) feet in length! Because of its importance to a successful assembly and acceptable insulation integrity, the analysis of loose-fill insulation compaction characteristics, is described in greater detail in the following section.

Two key results, from which it was concluded that a long continuous ICCT section of at least 300 m. in length could be assembled without requiring a girth butt weld, were that a critical maximum spacing existed for the ICCT centralizers and that a special grade of granular insulation was required for which the frictional resistance was approximately one order of magnitude less than that measured with the grade used in the base case thermal conductivity measurements. A final conclusion drawn from the laboratory friction force investigations, was that there appeared to be a considerably lower risk involved in becoming prematurely arrested by frictional forces in hole if a vertical orientation was selected for the ICCT prototype assembly.

Insulation Compaction

Effect on Thermal Performance obtaining the optimum compaction of the granular insulation is a key aspect of the ICCT insulation system and assembly procedure. From a thermal performance viewpoint, an optimum packing density exists for obtaining a minimum in conduction heat transfer. It was also found from the heat transfer test results, that a critical compaction density of the loose-fill insulation, is required to preclude the formation of natural convection loops within the ICCT annulus. A grade of granular insulation might also be chosen to absorb a majority of the radiant energy emissions from the inner tubing.

Effect on Frictional Resistance and Orientation

From an ICCT assembly viewpoint, the packing density also influenced the frictional sliding resistance which in turn was dependent upon the orientation of the concentric coiled tubing strings during assembly. Both horizontal and vertical orientations were considered for assembly of the ICCT prototype. The horizontal orientation offered the ability to apply much greater assembly forces to the inner string to overcome the frictional resistance of the insulation. The advantage was that both push and pull forces could be applied to the inner tubing string. The disadvantage was that compaction of the insulation could only be achieved through pressure applied by each centralizer as the columns of insulation between each centralizer was conveyed along the length of the outer tubing.

The vertical orientation offered the advantage of gravity assisted conveyance of the loose fill insulation as well as the ability to pre-compact the insulation to the optimum value with the assistance of mechanical vibration applied to the outer tubing. The major disadvantage, however, was that the maximum axial forces which could be applied to the inner tubing to overcome the frictional resistance were severely limited by the column strength of the inner tubing, although a favorable slenderness ratio of less than 40 was achievable.

Laboratory Testing

To establish the necessary insulation compaction, laboratory test equipment included the use of pneumatic vibrators attached to the fill hopper and outer coiled tubing. Tests were performed to determine the optimum ICCT assembly parameters. These included the amplitude and frequency of vibration, the location of vibrator attachment with respect to the inner tubing unsupported length, the orientation of the ICCT with increasing angle from the horizontal, the time of vibration application varying from continuous to intermittent or interrupted periods of vibration and the speed of insertion of the inner tubing. The latter variable was restricted by the time necessary to attach the centralizers at a given spacing to a moving inner tubing string and this was limited by the length of exposed inner tubing between the exit point from the tubing injector or lubricator connection to the entry point at the level of insulation in the filling hopper.

Tests were conducted on loose-fill insulation of differing grade. Measured compaction after mechanical vibration but without the application of pressure from the centralizers was in the range of 30 % of the column height attained by gravity filling of a plexiglas ICCT model in a vertical orientation. This model showed the formation of insulation voids without the application of mechanical vibration using the first prototype centralizer design. No voids were present after vibration, however, since it was desired for insulation to sift past the centralizers without vibrational assistance, the centralizer axial grooves were enlarged. This represented the only modification to the centralizer prototype design.

For the maximum possible inclination of the ICCT test frame from the horizontal, somewhat larger friction forces were measured when the insulation was vibrated intermittently compared to that of continuous vibration. Since optimum compaction from a thermal conductivity viewpoint was achieved at under one minute of continuous vibration and any additional frictional resistance was undesirable, it was decided to apply continuous vibration during the assembly of the ICCT prototype.

For the horizontal orientation, it was not possible to achieve uniform compaction of insulation around the complete circumference of the annulus. This difficulty could have, however, been overcome by the inclined insulation entry section to be incorporated in the ICCT horizontal assembly scheme. Differences in insulation compaction and effects on frictional resistance were difficult to obtain and measure due to the inability to obtain uniform compaction around the circumference of the insulation annulus. Generally, the application of vibration increased the frictional resistance which overall, was significantly greater than that encountered in a vertical orientation.

A key difference due to the horizontal orientation was the inability to pre-compact the insulation, with or without vibration, to the same degree as in the vertical orientation before the centralizers applied pressure to move the columns of insulation forward. This meant that the centralizers were required to pre-compact the insulation to a sufficient extent before a further application of force was effective in overcoming the frictional resistance of the insulation. This inevitably created larger insulation voids which were required to be filled with insulation sifting through the upstream centralizers.

ICCT Trial Assembly

To verify the proposed ICCT assembly procedure and investigate the integrity of the insulation system as well as the structural integrity of the insulated concentric tubing string, additional testing was performed on a 400-foot ICCT sample tubing at vertical test well facility. Included in the objectives of this testing were the assessment of the ease of attachment of the centralizers, investigation of the distribution and compaction of insulation, measurement of friction forces associated with a vertical orientation and identification of any additional requirements or component modifications in preparation for the construction of the ICCT prototype.

A flange was welded to the outer 2⅞" tubing to hang this string from the test well BOP. A mating flange was welded to the bottom of a filling hopper and bolted to outer tubing flange hangar. A coiled tubing support frame and working platform were positioned over well center. A pneumatic vibrator was attached to the insulation hopper, however, because the ICCT test sample was hung from the BOP, it was not possible to vibrate the outer tubing. Hence, it was anticipated that an optimum compaction of the insulation would not be achieved for these trial assembly tests.

Test Well Trial Assembly

A nylon wiper was sandwiched between two centralizers attached at the leading end of the inner tubing to support the first column of loose fill insulation. The inner tubing was then run to bottom to ensure free passage and to monitor the running forces without the frictional resistance associated with the insulation. The inner tubing was then pulled to surface and the hopper was filled with insulation. A steel rod with handle attached was used as a measuring stick to locate the proper spacing of the centralizers. Some test centralizers were equipped with one or two radial setscrews and combinations of different sizes, to determine if these were necessary to prevent slippage during ICCT assembly. Once attached, the inner tubing adjacent to the centralizers was spray painted to help identify any slippage.

The inner tubing was run in at different rates to evaluate the ability to attach the centralizers at different tubing speeds and available time intervals. The filling and compaction of insulation into the annulus would also be affected by different tubing insertion speeds. Insertion forces were measured and plotted under running and start and stop conditions.

Insulation and Structural Integrity

Once assembled, the 400-foot sample ICCT was wound and unwound several times onto the spooler reel to assess the forces and reel torques involved and to verify the design objective-that ICCT strings can be withdrawn and reinserted a finite number of times during its service life. The outer tubing of the ICCT test sample was inspected for physical damage or excessive localized deformation which might result from concentrated loads at the centralizer support points. Since the machined crown on the perimeter of the centralizers was also designed to distribute the reaction forces in contact with the outer tubing over the width of the centralizers, no damage or localized deformation was obtained.

With the ICCT test sample wound on the yard spooler reel, inspection windows were cut into the 2⅞" outer tubing at the theoretical locations of the centralizers. This showed that slippage of the centralizers did not occur except for those which did not contain radial set screws to lock onto the inner tubing. Hence the need for at least one radial set screw was confirmed by the trial assembly testing.

The inspection windows also confirmed that the insulation was uniformly distributed around the circumference of the annulus. Also seen was that, although somewhat compacted radially by the eccentricities of the two tubing strings resulting from differing residual curvatures between the inner and outer tubing, a continuous layer of insulation remained in place after several cycles of winding the sample ICCT on the tubing reel. The correct spacing of the centralizers was also confirmed with respect to one of its design functions of precluding physical contact between the two concentric tubing strings.

The existence of insulation voids was, however, revealed at some centralizer locations and these voids grew in size towards the top of the 400 foot ICCT test section. This confirmed the requirement of a modified assembly arrangement for the ICCT prototype which would allow a top section of the outer coiled tubing below the insulation fill hopper to be vibrated to compact the insulation to desired levels. It also indicated a modified centralizer design which would facilitate the passage of granular insulation from above the centralizers to fill any voids which may be formed below the centralizers.

The results of friction force measurements and observations on insulation compaction made both in the laboratory and in test well trial assemblies, confirmed the preliminary conclusion drawn from the 20-foot ICCT laboratory testing, that the vertical orientation was the preferred method of ICCT prototype assembly. This conclusion was drawn even though it was not clearly determined whether sufficient axial compressive forces could be applied to the inner tubing to overcome the maximum frictional resistance associated with a continuous ICCT tubing length which would be considered economical before a welded connection had to be included in the cost of this new thermal tubing technology.

Prototype ICCT Assembly

Although vertical assembly forces were severely limited by the buckling instability of the unsupported section of the inner tubing, it was predicted that this would be offset by a much lower frictional resistance compared with that measured in the laboratory for a horizontal orientation. Accurate friction force estimates under a vertical orientation could not be obtained, however it was decided that they represented the least risk. An abandoned vertical well in close proximity to Calgary city limits was offered for use in the assembly of the ICCT prototype.

A special frame was fabricated which spanned the interior of a standard coiled tubing injector substructure. This frame permitted the outer tubing to be suspended some distance above the elevation of the BOP which in turn, enabled a vibrator to be attached to the outer tubing to ensure the desired compaction of the insulation along the entry section below the fill hopper.

The centralizers were attached at predetermined intervals and markings applied to the inner tubing which was moving at a constant speed. Battery powered screw drivers with pre-set torque were used to stab and drive assembly cap screws to position the centralizers on the tubing after which the radial set screw was tightened to secure them firmly in place and prevent their slippage once the inner tubing, centralizers and insulation entered into the outer tubing.

Since it was not known in advance what maximum length could be assembled with the maximum compressive forces available, preparation was made for possible orbital welding of ICCT girth joints to construct the required ICCT sections from shorter lengths. The inventor prepared the necessary welding procedure specification for orbital GMAW of the concentric coiled tubing. Although plans were made to use advanced orbital welding equipment, it was found to be more expedient to subcontract these tasks in view of the tight project deadlines. Welding was performed on the ICCT assembly floor with one section suspended in the well and the mating section spooled off the coiled tubing reel and aligned with the suspended section using chain comealongs. Orbital welding was also used to attach the steam nozzle to the concentric tubing in accordance with the steam nozzle assembly drawing shown in FIG. 1A.

For various reasons, the lengths of individual ICCT assemblies ranged from 127 m to 515 m requiring three girth welds for the total 1745 m string length. Since the maximum section length of 515 m was not limited because of friction, (further assembly was terminated because the desired ICCT section length had been constructed), it was felt that future ICCT strings of similar lengths could be assembled requiring at most one orbital girth weld. As well, the experience gained during the prototype assembly, would enable future assembly times to be substantially reduced.

Assembly was completed with installation at the steam injection pilot well scheduled soon thereafter. New ground for coiled tubing operational personnel was broken in the handling of the larger and stiffer coiled tubing. This included a new and larger CT yard spooler and steel reels which were fabricated to custom design specifications.

Pilot Well ICCT Installation

The two assembled ICCT sections, spooled onto steel coiled tubing reels, were trucked up to the steam injection pilot project well at Cactus Lake near Provost, Alberta. (Sub-zero weather conditions prevailed) as per the SW-SAGD patent application. A coiled tubing BOP was set and scaffolding was erected in preparation for ICCT installation. A plug 10 was inserted in the steam nozzle orifice as shown in FIG. 1A, to prevent plugging with foreign matter while running the ICCT into the well. The plug was designed to be blown out by steam pressure.

ICCT Performance Record

Two aspects of performance monitored and evaluated under field service conditions are presented. These involve the thermal and mechanical endurance of the new ICCT steam injection string and the production and well servicing record of the pilot well. A key measure of the latter, of course, comprises a sustained increase in oil production over previous values.

Single Well SAGD Process

In simplistic term, a SAGD heavy oil recovery process involves a horizontal oil production well drilled and completed a short distance above the lower extent of an oil bearing formation. Steam is injected at some point. The increased temperature of the formation reduces the oil viscosity to a point at which it begins to flow under gravity towards the horizontal well bore, with its temperature continually rising and its viscosity reducing until it is heated to the boundary value temperature of the production liner. While the heated oil is drawn into the production liner annulus by pressure differential existing between the higher formation pressure and the lower annulus pressure, transported sand is filtered out by the sand screens. Since sufficient reservoir pressure is generally not available to drive the produced fluid mixture to surface, a bottomhole pump takes over to raise the water-cut oil to surface.

In conventional SAGD processes, the well is not produced immediately after commencing steam injection which is achieved through a separate well or wells. (In the "Huff n puff" method, a single well is used except that the injection and production are performed sequentially). A steam flood period is provided to allow the injected thermal energy to "soak" into the formation with the objective to heat as large a producing zone as possible.

The SW-SAGD process disclosed in the copending patent application referenced above utilizes a single well (hence the acronym SW-SAGD) to simultaneously inject steam and produce oil continuously without intermittent soaking or shut-in periods. Since this represents a thermo fluid-dynamic system, steam injection flow rates, temperatures, pressures as well as pumping rates and pressures can be controlled to achieve optimum production equilibrium in real time as the reservoir becomes depleted and the steam chamber, established in the production zone, begins to grow. For example, the oil pumping rate can be controlled to provide sufficient time for heat transfer and for all the steam to condense before being recycled to surface.

There are three key functions which insulated tubing performs that are critical to the success of this new EOR process. First, the insulation, with a low and non-degrading thermal conductivity, enables steam with much greater quality and internal energy to establish a higher grade heat line-source to enable greater heat transfer penetration into the oil bearing formation. Secondly, such insulation limits the heat transferred to the fluids contained in the annulus of the vertical section of the well. This ensures that they remain in a single-phase liquid state to impose the necessary hydrostatic head above the two-phase fluids residing in the horizontal section of the well bore to enable continuous downhole steam injection pressure control. A third function of the insulated tubing is to limit the heat transfer to the casing such that the integrity of the casing cement is not threatened by an excessive temperature rise. In addition, as has already been noted, the relatively smaller outer diameter of an insulated "coiled tubing" string permits the use of smaller well bore and casing sizes. This may result in reduced drilling and capital costs which may greatly improve the economics of heavy oil production.

Performance of the ICCT Prototype

Except for some minor interruptions, steam injection and oil production proceeded continuously. During the start-up phase, the ICCT prototype was loaded through many severe thermal and pressure cycles which tested its structural and mechanical integrity. No structural or mechanical failures have been reported to date.

Comparison of measured temperatures of the injected steam and fluids existing in the annulus of the intermediate casing, has shown that the insulation of the ICCT is performing as measured by laboratory heat loss testing.

The well annulus below the wellhead was continually monitored for signs of steam leakage of the special PBR seal stack. No leakage was detected.

ICCT Versus Joined Thermal Tubing

With the overall thermal conductivity of 0.03 to 0.05 Btu/hr-ft-F achieved with the new technology, being comparable with typical values of 0.03 to 0.05 Btu/hr-ft-F published for conventional segmented non-vacuum insulated tubing joints, the relative merits of each design may be compared on other than thermal considerations. These can be summarized as follows:

A major advantage of insulated coiled tubing is the elimination of upsets at threaded tool joints to permit the use of smaller well bore sizes. The cost savings associated with this are discussed in the section on economics below.

Another key advantage of insulated coiled tubing in horizontal well applications is that by virtue of its manufacture from coiled tubing components, it is able to negotiate a higher build radius when kicking off from vertical to horizontal.

The advantages of avoiding pre-stressed members with respect to susceptibility to stress corrosion cracking are extremely important since steam stimulated oil production generally involves sour well conditions. Sour well conditions can result in stress sheer cracking failures.

The relative ease to withdraw a coiled tubing string from a steam injection well for workover and/or inspection and to reinstall the string in a much shorter turn around time reduces loss of production from longer downtimes expected with jointed thermal tubing.

The relative ease of insulated coiled tubing withdrawal, transportation and installation at an alternate steam injection site may also be an attractive feature.

With the advent of new and proven hydrogen getter technology, the possibility exists than an ICCT may be re-designed and constructed utilizing a vacuum insulation system. There are, however, significant restrictions and limitations with presently available vacuum insulation systems for use in the heavy oil and other oil and gas downhole applications as discussed in the following section.

Vacuum Insulation Systems in Oil and Gas Service

Conventional thermal tubing joints using vacuum insulation systems offer a thermal conductivity an order of magnitude less for new and as-built tubing. Service experience had shown, however, that in-situ thermal conductivities were severely degraded after only several months of steam injection. A vacuum is effective only in eliminating the conduction and convection modes of heat transfer. To offset the radiation heat transfer, vacuum insulation systems require low emissivity and highly reflective coatings or surface finishes. Since radiation can be a significant fraction of the total heat transfer, any deterioration of the low emissivity surface properties during service can result in a significant increase in heat losses for vacuum insulated tubing. In the ICCT design, such finishes or coatings are not required since the special grade of insulation used acts to absorb the radiation energy emitted from the hot inner tubing surface.

Furthermore, in EOR steam injection processes, a common occurrence is the production of hydrogen sulfide gases. As discussed elsewhere, the formation of hydrogen gas produced during the chemical reactions of $H_2S$ with steel, will readily diffuse through the steel tubing, particularly at steel temperatures greater than ambient. The resulting contamination of the vacuum insulation space with hydrogen gas could increase the thermal conductivity to values more than four times that of the ICCT and other non-vacuum insulated thermal tubing designs.

Present efforts to maintain a clean vacuum still involve the use of hydrogen getters, albeit newly developed and advanced chemical getters, to satisfactorily absorb the contaminating hydrogen from the vacuum, are claimed to be in service. To achieve this, the new getters would still have to absorb the hydrogen at a much greater rate than its infiltration from the formation which constitutes an infinite hydrogen source. Achieving the required rate of absorption as well as the saturation limitations of the getters to adequately negate the hydrogen contamination, remain questionable.

In any event, it would be possible to utilize the heat loss test cell to measure thermal conductivities at various rates of hydrogen infiltration and residual concentrations achievable with new hydrogen getters placed to simulate any thermal tubing vacuum system design. Since it was shown that the thermal conductivity of the ICCT insulation system is not affected by gaseous constituents residing interstitially among the loose fill insulation grains, the thermal conductivity of the ICCT technology is not degraded by the infiltration of any hydrogen gas.

Rarefied gas dynamic calculations were also performed on the molecular transport of hydrogen within the confining annulus which showed that the capability of any vacuum pump is limited in the rate and distance over which a vacuum in such an annulus can be maintained within the narrow gap of the insulation annulus. Hence, any efforts to pump or attempts to outgas the hydrogen by other means, will likely be unsuccessful.

Since conventional jointed thermal tubing utilize a much more complex insulation design and construction it can be expected that they are inherently more costly to manufacture. They can also be expected to be more expensive to install due to the make-up and strict quality control requirements of threaded connections which are avoided by the new ICCT technology.

Production Economics and ICCT Costs

The ability to eliminate second wells and pursue single well EOR processes in smaller well bores, as made possible by the new ICCT technology should have a significantly favorable impact on heavy oil production which could well include the production of oil from tar sand deposits.
ICCT Costs Since there are fixed plant production costs per joint to manufacture conventional jointed thermal tubing, they can readily be priced per joint, foot or meter, a joint being in the range of 30 to 40 feet long. Because of the continuous length method of manufacture of the prototype ICCT, the cost to manufacture a single ICCT string of longer length may not be significantly greater than that for a shorter length since the incremental costs are associated primarily with the additional material and labor costs. Dividing the total cost by the total length would result in a lower cost per unit length for longer ICCT strings. Conversely, the manufacture of a single, very short ICCT string would result in a high unit cost. For the typical thermal string lengths involved in steam injection processes as used in the oil and gas industry, and since cost comparisons with conventional jointed thermal tubing will inevitably be made, the unit costs for insulated coiled tubing are expected to be less than that for present market prices of conventional jointed thermal tubing. A shorter "break even" length will exist, for which unit costs will be equivalent for the conventional and new thermal tubing technology.

Improvements to the first prototype are being incorporated, both from a component design and manufacturing aspects. Valuable suggestions for improvements in design and assembly efficiencies were recorded as a result of the experience gained during the construction and installation of the first ICCT prototype. It is expected that the next ICCT manufacture will verify that projected cost reductions for an ICCT production model can be realized.
Manufacture of ICCT Numbers 2 and 3

Two additional ICCT strings, one at 2000 m and the other at 1,800m, are under construction and/or being brought into SW-SAGD service as per the method of the SW-SAGD patent application. One will be installed adjacent to the pilot well while the other will evaluate the process in different heavy oil formations in order to further test the invention.
Modification for sour service The pilot well site has not shown any signs of hydrogen sulfide generation throughout its nine months of operation. The next pilot to come on stream will do so under somewhat sour conditions. Although it has not been concluded that actual $H_2S$ concentrations will require special considerations, modifications to some ICCT components can readily be made to ensure their sour service integrity. An example of this is a modified centralizer design which has been completed for the next ICCT strings. See FIG. 5. The modifications involve the selection of a different steel alloy, a heat treatment to control critical hardness values and a revised mechanical design to reduce working stresses.
"Fitness-for Purpose" Materials Testing Research efforts have produced considerable information on the performance of coiled tubing under sour well conditions. Additional materials testing will be performed for a fitness-for purpose evaluation of different CT grades and manufacturing processes for service in steam injection applications.
ICCT Assembly and installation Procedures Work is under way to derive more efficient ICCT assembly and installation procedures. Numerous improvements had been identified and recorded during the assembly and installation of the ICCT prototype which offered the potential for significant manufacturing cost reductions. These modifications will be incorporated into the manufacture of the next ICCT strings which can be expected to reveal even further improvement for potential additional cost reductions.
Improvements in PBR Design Secure Oil Tools Ltd. has completed design modifications of the thermal expansion joints to be used in the next ICCT string assemblies. These modifications will facilitate the welded connection of the threaded couplings to the inner and out CT during ICCT assembly as well as the make-up of the PBR to the ICCT prior to installation at the steam injection well site.

A further PBR redesign will enable the expansion joints to be attached as integral components of the ICCT string during assembly. This may enable the PBR to be wound on the transport reels prior to shipment to the steam injection site where it would result in a significant reduction in the installation time. This "spoolable PBR" is expected to undergo testing in the near future.
Improvements in Wellhead Design Walker Steel Ltd. has introduced some minor modifications to the dual completion wellhead; one key modification will eliminate a difficulty experienced with the landing and seating of the dog nut during installation of the prototype ICCT.

Conclusions

It has been shown by the assembly of the first ICCT prototype that an insulated and/or concentric coiled tubing string can be constructed to continuous lengths equal to the maximum continuous length of coiled tubing available from the mill without containing a girth butt weld. This length is typically 600 m or 2,000 feet. Assembly of the second ICCT string has shown that continuous lengths approaching 1000 m can be assembled without girth welds.

The overall thermal conductivity of the ICCT is in the range of 0.03 to 0.04 Btu/hr-ft-F. This is comparable to that of non-vacuum insulated conventional jointed thermal tubing which have a greater heat loss due to a larger thermal coefficient of 0.05 Btu/hr-ft-F at threaded connections.

Higher than conventional steam temperatures in combination with higher pressures are made possible for heavy oil or tar sand oil production with the use of ICCT steam injection strings.

The new technology results in a significant reduction in well completion and operation costs since smaller well bore sizes are possible and since greater fuel efficiencies are possible for steam based EOR processes by the smaller outside diameter which is retained throughout the total length of the thermal tubing string.

Successful field performance with the first ICCT prototype string has been obtained to date which represents a period exceeding three quarters of a year.

The ICCT technology, used in conjunction with new steam injection processes, has resulted in a significant improvement in the economics of heavy oil production involving thermal EOR processes, through a reduction of capital and operational costs and an increase in oil production compared with conventional steam EOR process.

ICCT tubing can be manufactured in current standard sizes ranging from 1 inch inner by 2 inches outer to 2⅜ inches inner to 3½ inch outer with tubing wall thickness ranging from 0.080 inches to 0.203 inches depending upon ICCT size. Larger than 3½ inch outer with correspondingly larger inner tubing sizes, appear possible in the near future.

The foregoing disclosure and description of the invention are illustrative and explanatory thereof. Various changes in the size, shape and materials as well as the details of the illustrated construction may be made without departing from the spirit of the invention.

What is claimed is:

1. A coiled tubing composite, comprising:
    an inner coiled tubing positioned within an outer coiled tubing defining an annulus therebetween; and
    a plurality of centralizers longitudinally spaced within said annulus between said inner and outer tubing at multiple intervals along the length of the composite;
    wherein said composite exhibits sufficient flexibility for reeling on a truckable spool and sufficient stiffness for injecting in a bore.
2. The composite of claim 1 wherein said annulus includes insulation.
3. The composite of claim 1 wherein said centralizers include insulating material.
4. The composite of claim 1 including means for sealing at least a portion of said annulus.
5. The composite of claim 1 that includes means for sealing said annulus from external fluid communication while providing for internal fluid communication therethrough.
6. The composite of claim 1 wherein said inner tubing is affixed to said outer tubing at one end of said composite.
7. The composite of claim 1 wherein said inner tubing is sealed against said outer tubing at one end of said composite.
8. The composite of claim 1 wherein said inner tubing is affixed to said outer tubing at two ends of said composite.
9. The composite of claim 1 wherein said inner tubing is sealed against said outer tubing at two ends of said composite.
10. The composite of claim 1 wherein an outside diameter of said inner tubing ranges between 1 inch and 5 inches and an outside diameter of said outer tubing ranges between 2 inches and 6 inches.
11. The composite of claim 1 wherein the width of said annulus comprises approximately ½ inch.
12. The composite of claim 2 wherein said insulation compromises a vacuum.
13. The composite of claim 2 wherein said insulation includes inert gas.
14. The composite of claim 2 that exhibits an average thermal conductivity, measured radially from inside said inner tubing to outside said outer tubing, of less than 0.1 Btu per hour per foot per degree Fahrenheit.
15. The composite of claim 2 wherein said insulation comprises loose fill insulation.
16. The composite of claim 2 wherein said insulation comprises finely ground loose fill insulation.
17. The composite of claim 2 wherein said insulation includes perlite.
18. The composite of claim 1 wherein said centralizers include an aperture permitting fluid communication therethrough within said annulus.
19. The composite of claim 1 wherein said centralizers include outer peripheral grooves.
20. The composite of claim 1 wherein said centralizers are longitudinally spaced apart at approximately 5 to 7 feet.
21. The composite of claim 1 wherein said centralizers comprise split steel rings.
22. The composite of claim 1 wherein said centralizer includes a liner formed of ceramic, said liner forming a contact between said centralizer and said inner coiled tubing.
23. The composite of claim 22 wherein said liner and said centralizer exhibit similar co-efficients of thermal expansion.
24. The composite of claim 22 wherein said ceramic liner exhibits low thermal conductivity.
25. The composite of claim 22 wherein said ceramic liner exhibits a high coefficient of friction.
26. The composite of claim 1 wherein said centralizer includes a crowned outer periphery for contact with said outer tubing.
27. The composite of claim 1 wherein one end of said inner tubing and one end of said outer tubing are attached to an expansion joint.
28. The composite of claim 27 wherein said expansion joint includes a seal attached to a wall of said expansion joint for sliding sealing engagement with a mandrel attached to said inner tubing.
29. The composite of claim 27 wherein said expansion joint includes a radial port providing for fluid communication through a wall of said expansion joint.
30. A method for assembling a concentric coiled tubing composite, comprising:
    (a) attaching a centralizer to a portion of a first coiled tubing length;
    (b) inserting said centralizer and a portion of said first tubing length into an end of a second coiled tubing length; and
    repeating said steps (a) and (b) to produce a composite concentric coiled tubing.
31. The method of claim 30 that includes straightening a portion of said first tubing length prior to inserting said portion into said second tubing.
32. The method of claim 30 that includes deploying said outer coiled tubing length in a vertical well while inserting at least a portion of said inner tubing length.
33. The method of claim 32 that includes straightening a portion of said outer coiled tubing prior to deploying in said well.
34. The method of claim 30 that includes spooling said composite on a truckable spool.
35. The method of claim 30 that includes affixing an end of said inner coiled tubing length to an end of said outer coiled tubing length.
36. The method of claim 30 that includes attaching successive centralizers approximately 6 feet apart.
37. The method of claim 30 that includes filling an annular region defined between said inner and said outer tubing lengths with insulating material.

38. The method of claim 37 that includes vibrating said outer tubing.

39. The method of claim 37 wherein said insulating material comprises finely ground particles.

40. The method of claim 30 wherein said steps (a) and (b) are performed continuously.

41. Apparatus for heat assisted production of hydrocarbons and minerals from a well bore, comprising in combination:

several hundred feet of insulated tubing coiled on a truckable reel;

a coiled tubing injector for receiving said coiled tubing from said reel and injecting said tubing into said well bore; and a source of heat including adapting apparatus for placing said source in fluid communication with said tubing.

42. The apparatus of claim 41 that includes an expansion joint attached to said tubing.

43. The apparatus of claim 41 wherein said source of heat compromises steam.

44. The apparatus of claim 41 wherein said tubing is electrically conducting, said insulation is electrically insulating and said source comprises a source of electric current in contact with said tubing.

45. The apparatus of claim 41 wherein said insulated tubing comprises two lengths of coiled tubing positioned one inside the other having insulation positioned in the annulus defined therebetween.

46. The apparatus of claim 41 wherein said insulated tubing exhibits an average overall co-efficient of thermal conductivity, measured radially, of less than 0.1 Btu per hour per linear foot per degree Fahrenheit.

47. The apparatus of claim 45 wherein said inner and outer coiled tubing lengths are separated by centralizers.

48. Coiled tubing apparatus comprising:

a reel having a diameter of less than 6 meters;

a continuous length of tubing coiled on said reel having a diameter of less than 10 inches;

material attached to said tubing providing radial insulation along said tubing length;

and a tubing injector adapted to receive said tubing from said reel and inject said tubing into a bore.

49. The apparatus of claim 48 wherein said composite exhibits an average radial co-efficient of thermal conductivity of less than 1.0 Btu per linear foot per hour per degree Fahrenheit.

50. The apparatus of claim 48 wherein said tubing includes two lengths of tubing, one inside the other, having insulation sealed therebetween.

51. The apparatus of claim 50 including centralizers spaced longitudinally between said inner and said outer lengths of tubing.

52. The apparatus of claim 48 wherein said tubing is capable of withstanding heat up to at least 250° C.

53. apparatus of claim 48 wherein said tubing is capable of withstanding oil/gas well corrosion.

54. apparatus of claim 48 wherein said tubing is capable of withstanding pressure of at least 1000 psi.

55. Apparatus of claim 50 that includes a thermal expansion joint and means for attaching said joint to said tubing.

56. Insulated coiled tubing comprising a coiled tubing length having an outside diameter of between 1" and 6" and a plurality of centralizers longitudinally spaced at multiple intervals along said length.

57. The apparatus of claim 56 wherein said centralizers include insulating material.

58. The apparatus of claim 56 wherein said centralizers are spaced along said length at a distance of approximately 5 feet to 7 feet.

59. The apparatus of claim 56 that includes insulation adjacent said tubing between said centralizers along said length.

60. The apparatus of claim 59 wherein said insulation comprises thermal insulation.

61. The apparatus of claim 59 wherein said insulation comprises electrical insulation.

62. The apparatus of claim 57 wherein said centralizer insulating material includes ceramic material.

63. A method for assembling insulated coiled tubing, comprising:

(a) attaching a centralizer to a portion of a first coiled tubing length;

(b) inserting said centralizer and a portion of said first tubing length into an end of a second tubing length; and (c) providing insulation between said first coiled tubing and said second tubing.

64. Apparatus for heat assisted production of hydrocarbons and minerals from a wellbore, comprising in combination:

several hundred feet of tubing coiled on a truckable reel;

a coiled tubing injector for receiving said coiled tubing from said reel and injecting said tubing into said well bore;

insulating means for providing insulation adjacent said tubing; and a source of heat including adapting apparatus for placing said source in fluid communication with said tubing.

65. Coiled tubing apparatus comprising:

a reel having a diameter of less that six meters;

a continuous length of tubing coiled on said reel having a diameter of less than 10";

a tubing injector adapted to receive said tubing from said reel and inject said tubing into a bore; and material attached to and surrounded by said tubing providing radial insulation along said tubing length.

66. The apparatus of claim 65 wherein said material provides thermal insulation.

67. The apparatus of claim 65 wherein said material provides electrical insulation.

68. A coiled tubing composite, comprising:

an inner coiled tubing positioned within an outer coiled tubing defining an annulus therebetween; and insulation within said annulus between said inner and outer tubing;

said insulated composite reeled on a truckable spool while structured with sufficient stiffness for injecting in a bore.

69. A method for assembling an insulated coiled tubing composite, comprising:

inserting an outer coiled tubing length into a bore hole;

inserting an inner coiled tubing length through an end of said outer length;

inserting insulation between said inner tubing length, and said outer tubing length and reeling the insulated composite upon a truckable spool.

70. The method of claim 69 wherein said insulation comprises thermal insulation.

71. The method of claim 69 wherein said insulation comprises electrical insulation.

* * * * *

UNITED STATES PATENT AND TRADEMARK OFFICE
CERTIFICATE OF CORRECTION

PATENT NO.   : 6,015,015
DATED        : January 18, 2000
INVENTOR(S)  : Luft, et al.

It is certified that error appears in the above-identified patent and that said Letters Patent is hereby corrected as shown below:

Column 5,
Line 5, after "tubing", insert -- . --.

Column 7,
Line 36, after "Embodiments", insert another line and insert -- Nomenclature --.
Line 39, after "gravity" and before "drainage", delete ".".
Lines 45-46, after "ICCT" and before "annular, delete ".".
Line 59, delete " 'k" ", insert -- 'k' --.

Column 8,
Line 59, delete "0.05 Btu/hr-ft-°F.°", insert -- 0.05 BTU/hr-ft-°F. -- .

Column 9,
Line 16, after "attach a", delete "the".

Column 13,
Line 34, delete "on", insert -- or --.

Column 14,
Line 1, delete attaches, insert -- attached --.

Column 16,
line 26, delete "impressibly", insert --impermissibly --.

Column 17,
Line 57, delete "ninner", insert -- inner --.

Column 20,
Line 32, delete "disbanding", insert -- disbonding --.

UNITED STATES PATENT AND TRADEMARK OFFICE
CERTIFICATE OF CORRECTION

PATENT NO. : 6,015,015
DATED : January 18, 2000
INVENTOR(S) : Luft, et al.

It is certified that error appears in the above-identified patent and that said Letters Patent is hereby corrected as shown below:

Column 22,
Line 32, after "air", insert -- in --.

Column 23,
Line 6, after "the" and before "Perlite", delete "-".
Line 65, delete "kg", insert -- $k^s$ --.

Column 27,
Line 19, delete "should", insert -- could --.

Column 28,
line 42, delete "obtaining", insert -- Obtaining --.

Column 29,
Line 32, delete "plexiglas", insert -- plexiglass --.

Column 30,
Line 22, delete "hangar", insert -- hanger --.
Line 55, after "objective" and before "that", delete "-".

Column 33,
Line 60, delete "Joined", insert -- Jointed --.

Column 34,
Line 24, delete "than", insert -- that --.

Column 36,
Line 37, delete "out", insert --outer --.

Column 39,
Line 35, claim 48, delete "m eters", insert -- meters --.
Line 54, claim 53, insert -- The -- before "apparatus".
Line 56, claim 54, insert -- The -- before "apparatus".

UNITED STATES PATENT AND TRADEMARK OFFICE
CERTIFICATE OF CORRECTION

PATENT NO.     : 6,015,015
DATED          : January 18, 2000
INVENTOR(S)    : Luft, et al.

It is certified that error appears in the above-identified patent and that said Letters Patent is hereby corrected as shown below:

<u>Column 40,</u>
Line 59, claim 69, after "inner tubing length", delete ", and".
Line 60, after "outer tubing length", insert -- , --.

Signed and Sealed this

Seventh Day of August, 2001

*Attest:*

*Attesting Officer*

NICHOLAS P. GODICI
*Acting Director of the United States Patent and Trademark Office*